United States Patent [19]

Naka et al.

[11] Patent Number: 5,241,296
[45] Date of Patent: Aug. 31, 1993

[54] PLANT ACTIVATION TRACKING AND DISPLAY APPARATUS

[75] Inventors: Yuji Naka, 419-57, Kaminakazatocho, Isogo-ku, Yokohama-shi, Kanagawa; Hiroshi Takiyama, Hiratsuka, both of Japan

[73] Assignees: Information Service International Dentsu, Ltd.; Kabushiki Kaisha Technosystems, both of Tokyo; Yuji Naka, Kanagawa, all of Japan

[21] Appl. No.: 661,881

[22] Filed: Feb. 27, 1991

[51] Int. Cl.⁵ .............................................. G08B 25/00
[52] U.S. Cl. .............................. 340/525; 340/815.12; 60/660
[58] Field of Search ............. 60/660; 340/525, 286.13, 340/286.14, 815.12, 815.06

[56] References Cited

U.S. PATENT DOCUMENTS

| | | | |
|---|---|---|---|
| 3,896,041 | 7/1975 | Alliston | 376/217 |
| 4,588,987 | 5/1986 | Stephens | 340/286.13 |
| 4,593,527 | 6/1986 | Nakamoto | 60/660 |
| 4,653,276 | 3/1987 | Sugano | 60/660 |
| 4,668,939 | 5/1987 | Kimura | 340/525 |
| 4,901,061 | 2/1990 | Twerdochlib | 340/501 |

OTHER PUBLICATIONS

ISA Proceedings, vol. 43, No. 3, 1988, Pittsburgh, pp. 1363–1374; Using Signed Directed Graphs to Provide Meaningful Process Alarm Messages, Hiromichi Hamasaki et al.
Automatisierungstechnische Praxis—ATP., vol. 32, No. 9, Sep. 1990, Selektive Erkennung von Mess-und, pp. 447–454, Anlagenfehlern in Gasverteilungsnetzen, G. Lappus, et al. Munich DE.
Webster's New World Dictionary, 3rd College Ed., p. 453.

Primary Examiner—Jin F. Ng
Assistant Examiner—Christine K. Oda
Attorney, Agent, or Firm—Frishauf, Holtz, Goodman & Woodward

[57] ABSTRACT

A plant activation tracking and display apparatus for use in a plant in which various points of plant components are represented by nodes including at least one system input node and at least one system output node, the adjacent nodes being connected to one another by means of fluid passages, with a pump unit and/or valve unit for creating a fluid flow in a specified direction being provided in the middle of each of the fluid passages in desired positions. An output device successively tracks each of the categorized fluids with a specified phase from the system input node to the system output node, and sequentially displays the array of the tracked nodes in one direction. A control device successively determines whether or not the operating conditions for the pump unit and/or valve unit are fulfilled, starting from the one located on the system input node side, and causes the output device to make an emphatic indication to the effect that the pump unit and/or valve unit concerned should be operated when the corresponding operating condition is fulfilled, and an emphatic indication of only the fluid passages between those nodes through which flows are caused by the operation of the pump unit and/or valve unit.

23 Claims, 27 Drawing Sheets

PLANT ACTIVATION TRACKING AND DISPLAY APPARATUS

BACKGROUND OF THE INVENTION

1. Field of the Invention

The present invention relates to a plant activation display apparatus which is suited for use in a plant which is expected to smoothly, securely perform plant operations, such as start-up, shutdown, and emergency shutdown operations of a chemical plant, or for plant activation evaluation through simulated plant operations.

2. Description of the Related Art

Many chemical plants comprise a very large number of plant components, including columns and vessels such as a reactors, distillation columns, heat exchangers, etc., and transportation apparatuses such as pumps, sophisticated piping, valves, and the like. The plant operations at the site of a chemical plant, which are examined to very fine details, are described in an operation standard or the like. The general plant operation is usually reviewed in accordance with the following three kinds of informations: the first information. The relates to the structure of the chemical plant. This information includes the types of units constituting the plant, the height and location of each unit, the states of connection between the units, equipment necessary to perform non-steady state operation such as start-up operation, the initial and final states in the plant, etc. The second kind of information relates to the steps of the procedure for operating the units, and the third kind of information relates to the execution timing for executing each step of the procedure.

Conventionally, in designing a plant, the plant operation procedure for the start-up operation starts to be examined when the basic flowsheet is completed. This will be described below with reference to FIG. 29. First, a designer, having the operation procedure in mind, decides the necessary piping location and the arrangement of pumps, main valves, etc. Then, the designer investigates the steps of the start-up operation procedure. The relationship between the designer's intention to operate the plant and the plant structure is often difficult for another designer to understand. Usually, a plant designer is not an operator, so that the operator often cannot fully understand the designer's intention of the operation procedure, or the designer cannot understand what the operator expects the operation procedure to be.

These problems are attributable to the fact that there are no specific methods to definitely connect the process design, its operation procedure, and the timing for the execution thereof, despite the intimate relationships between them. It is to be desired, in particular, that the execution timing as well as the conventional control systems are registered in a distributed control system (DCS), and are sequentially displayed on the display screen of an operation support apparatus. Various problems are caused by an indefinite representation of the relationships between the four elements shown in FIG. 29, including the plant design, operation procedure, execution timing, and operation support apparatus.

For instance, even when PFD (Process Flowsheet Diagram) and P & ID (Piping and Instrumentation Diagram) are completed at the design phase, describing the start-up procedure, shutdown procedure, etc. in the manuals requires much time. The preparation of manuals has not been systematized yet, and each designer in charge confirms his or her planned steps of the procedure on the completed flowsheets one after another, which requires much time. Since errors are likely to be made and the procedure is likely to be described in various expressions, moreover, the procedure would be very difficult for users (particularly, operators) to understand. The operation for converting the description of the procedure into the computer-aided operation support screen is believed to be an independent work project, which also requires much time and labor.

Chemical plants are often modified or revamped, in which case the operation procedure and execution timing should be modified at the same time. Conventionally, however, modified sections of the plant and the associated modification of the operation procedure are not clearly described, so that accurate modification requires much time and labor. In this case, the operation support screen should be also modified, which also requires much time.

Since the relationship between the operation procedure and the execution timing is not clearly illustrated at the design phase, it is likely that the valves, etc. are positioned at the wrong places. Such plant thus designed will need great efforts to operate the valves, etc. as well as complicated operations.

In shortening the start-up time, furthermore, it is very hard to be acquainted with the necessary preliminary apparatuses or equipment, or to know how to modify the operation procedure and execution timing.

If a chemical plant involves a combined unit which integrates several units, the difference between the operation procedure to operate the individual component units separately and those for operating the combined unit is not clear. It is often difficult, therefore, to determine whether the operation procedure to operate the individual units separately can be applied to the combined unit type.

Conventionally known are several studies on the representation of the plant operation procedure, although they are not satisfactory yet. These studies provide the following decision methods of operation procedures as follows:

(1) A method based on the assumption that valve operation controls the operation procedure for a chemical plant if it is designed so as to form a target flow from the inlet of the plant to the outlet (J. R. Rivas and D. F. Radd, AIChE J., vol. 20 (2), 320–325 (1974); O'Shima, J. Chem. Eng. Japan, vol. 11 (5), 390–395 (1978)).

(2) A so-called automatic start-up procedure synthesis method in which the definitions of the functions of the constituent units are strictly hierarchized, and the functions are connected in succession using a knowledge engineering approach (Hwang Kue Suku, Shigeyuki Tomita, Eiji O'shima, Chem. Eng. Reports vol. 14 (6), 728–738 (1988)).

(3) A method for determining the plant operation procedure by handling steps of procedure structured with the plant operation as a knowledge base (R. Lakshamanan and G. Stephanopoulos, Comput. Chem. Engng. vol. 12 (9/10), 985–1002 (1988); R. Lakshmanan and G. Stephanopoulos, Comput. Chem. Engng, vol. 12 (9/10), 1003–1021 (1988); R. H. Fusillo and G. J. Powers, Comput. Chem. Engng. vol. 12 (9/10), 1023–1034 (1988)).

These methods of determining the plant operation procedure are all designed to determine the operation procedure based on a given plant structure, and basically involving description in text. There is therefore a difficulty in describing parallel operations. Since the plant structure is not clearly described in association with the operation procedure, when the plant structure is changed, it is difficult to understand the correlation between the modification of the structure and the resulting, necessary modification of the operation procedure. In this case the operation procedure should be reconsidered from the beginning.

SUMMARY OF THE INVENTION

The object of the present invention is to provide a plant activation tracking and display apparatus which can ensure clear illustration of the relation between the process design, the operations and the execution timing, as well as can permit the illustration to be used as a screen to support the plant operation.

According to the present invention, there is provided a plant activation tracking and display apparatus for use in a plant in which various points of plant components are represented by nodes including at least one system input node, through which a fluid is externally supplied to the plant, and at least one system output node, through which fluid flows out from the plant, the adjacent nodes being connected to one another by means of fluid passages, with transporatation means and/or valve means for creating a fluid flow in a specified direction being provided in the middle of each of the fluid passages in desired positions. An output device of the plant activation display apparatus of the invention categorizes all fluids flowing through the fluid passages in accordance with the type and phase of the fluids, successively tracks each of the categorized fluids with a specified phase from the system input node to the system output node, and sequentially displaying the arrays of the tracked nodes in one direction. A memory device previously stores operating conditions for the transportation means and/or valve means. A sensor unit senses data in order to determine whether or not the operating conditions for the transportation means and/or valve means are fulfilled. A control device successively determines whether or not the operating conditions for the transportation means and/or valve means are fulfilled, starting from the one located on the system input node side, and causes the output device to make an emphatic indication to the effect that the transportation means and/or valve means concerned should be operated when the corresponding operating condition is fulfilled, and an emphatic indication of only the fluid passages between those nodes through which flows are caused by the operation of the transportation means and/or valve means.

If necessary, the plant components may include a heat exchanging component. In this case, at least one of the nodes is connected to a node of the heat exchanging component through energy transfer, the heat exchanging component being displayed on the output device, in the vicinity of the energy transferring nodes in parallel relation therewith. The fluids flowing through the fluid passages connected to that node which exchanges energy with the node of the heat exchanging component are regarded as identically categorized fluids if the fluids would change in phase state, around the node concerned. If necessary, the plant components include a hold-up device to be displayed as one node.

Basically, plant operations such as start-up operation, are intended to create flows of a fluid in a desired state between the nodes of the plant components by effecting "flow control" between the nodes and, if necessary, "holdup control." Thus, the present invention is based on an understanding that the plant operation procedure and execution timing can be displayed in association with the line configuration of the plant by successively tracking each of the categorized fluids with a specified phase from the system input node to the system output node, and displaying the arrays of the tracked nodes in one direction. The plant operation procedure and execution timing displayed on the output device in the aforesaid manner, that is, sequence graphs of the plant are represented along the fluid flows or in association with the line configuration.

Automatic operation may be enabled by providing the plant activation display apparatus of the present invention with drive means for driving the transportation means and/or valve means, so that the drive means is caused to drive the transportation and/or valve means when the operating conditions are fulfilled.

The plant activation display apparatus of the present invention may be used as a simulation support apparatus or a design support tool by replacing the sensor means with simulation signal output means for outputting a simulated signal for simulatively making the operating conditions on the transport means and/or valve means fulfilled. In this arrangement, it is successively determined whether or not the operating conditions for the transportation means and/or valve means are fulfilled, starting from the one located on the system input node side, depending on the presence of the simulation signal from the simulation signal output means, and the output device is caused to make an emphatic indication to the effect that the transportation means and/or valve means concerned should be operated when the corresponding operating condition is fulfilled, and an emphatic indication of only the fluid passages between those nodes through which flows are considered to have been caused by the operation of the transportation means and/or valve means.

DETAILED DESCRIPTION OF THE PREFERRED EMBODIMENTS

The following is a description of a plant activation display apparatus according to a first embodiment of the present invention, as applied to a distillation column system. Since this display apparatus functions as a process design support tool for a plant, the plant design procedure will be described first.

Line Configuration for Steady State Operation

Figure 3:
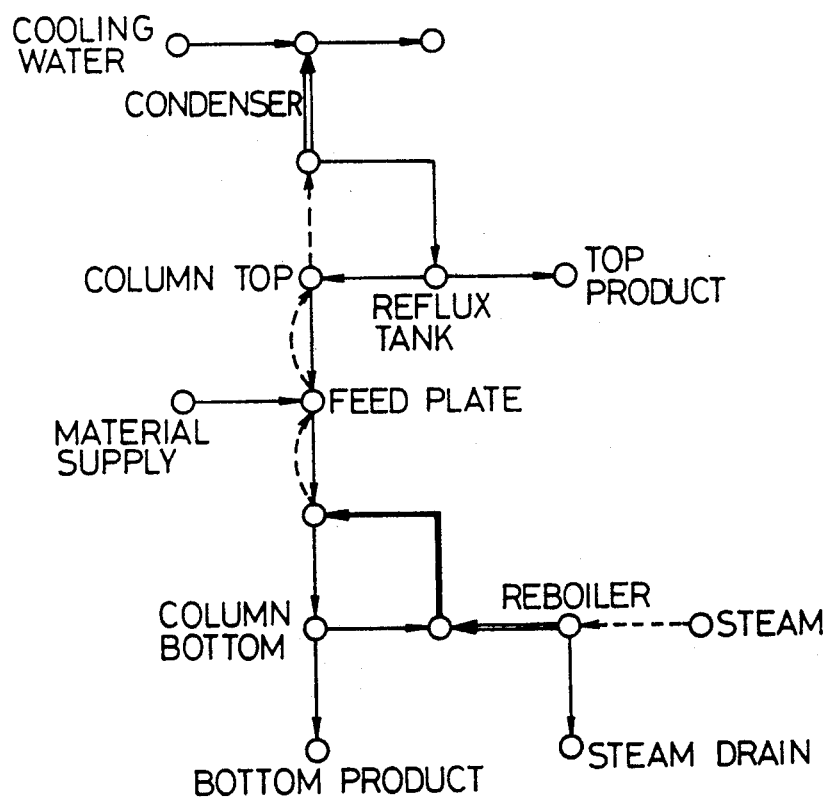
FIG. 3 is a flowsheet diagram showing a line configuration of a distillation column in a steady state operating condition.

Let it be supposed that a pipeline configuration for the steady state operation and internal states of the plant are previously determined at the stage of the basic process design. Principally, a distillation column comprises a column section, a reboiler, and a condenser, the last two serving as heat exchanging elements. FIG. 3 shows the line configuration and elevation for these elements. In FIG. 3, the arrows indicate the directions of flows; the regular full line represents a flow of a liquid, the thick full line a flow of a gas-liquid mixture, the broken line a flow of a gas, and the double line a flow of heat. A circle (○) indicates the point of an inlet, outlet, or junction of the fluid. In this case, the internal states of the plant, including the flow rate, composition, pressure, temperature, and the phase of the fluid, are previously determined as simulation data for the steady state operation. Also suppose that the premises for the selection of the individual components, working conditions, preliminary conditions, etc. are previously determined, and that the properties or reaction conditions of the fluid, such as the reactivity (polymerizability in particular), explosiveness, combustibility, toxicity, and corrosiveness, and other conditions, including the liability to crystallization, solidification, scale, slurry, etc., are given.

Layout of Pumps, Valves, etc.

Based on the above premises, the layout of valves, pumps and so forth necessary for the plant operation is determined. In making this decision, the concept of "flow control," which is essential to the realization of the present invention, is used.

The concept of "flow control" includes two meanings: The first one is related to the control of the fluid state or creation of a fluid flow, and the second one is related to timing control mainly for the valve operation to create the flow, which will be described in detail later. For the former mode of control, it is necessary to study how to create the flow of the fluid at a steady state as shown in the plot plan of FIG. 3, and to investigate a device which causes a change in phase of the fluid, if any, to result in heat exchange or a large pressure change (flash or the like).

Figure 4:
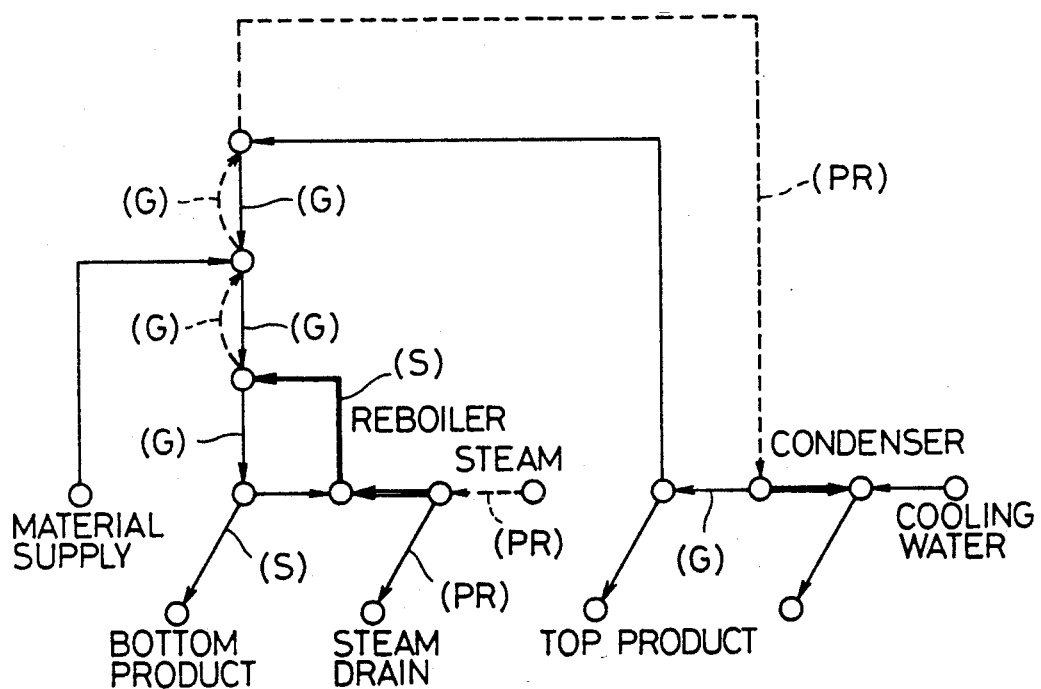
FIG. 4 is a flowsheet diagram distinctively showing fluid transportation means.

The schematic plot plan of FIG. 3 is therefore prepared at the stage of PFD design. Since the types and the locations of a material tank, condenser, reflux tank, reboiler, bottom tank, etc. have already been determined as known information, the locations of the inlet point, outlet point and junction point (each indicated by ○) shown in the flowsheet in FIG. 3 are rewritten, and at the same time, elements such as ejectors, which utilize external force to create a fluid flow, are distinguished from those which do not create such flow. FIG. 4 presents a flowsheet which distinguishes fluid transportation means. In this embodiment, those fluid transportation means which can create a fluid flow without using external force are indicated by labels "G," "S," and "PR." The label "G" represents the fluid transportation means capable of carrying the fluid through gravity, "S" the one capable of conveying the fluid utilizing the siphon effect, and "PR" the one capable of transporting the fluid by means of pressure drop originating from condensation.

As shown in FIG. 4, those fluids except vapor and the fluids affixed with the above symbols and classified accordingly need transportation means involves external force. This transportation means may be means for applying high pressure to the fluid to carry it, such as a compressor, a pump, an ejector, and a device for causing a throttle valve to cooperate with the heating operation, or means for decompressing the fluid to carry it, such as a decompressing pump, an ejector, and a device for causing a throttle valve to cooperate with an operation to condense gas. Any one of means can be properly selected in accordance with the fluid type, physical properties, etc.

Figure 5:
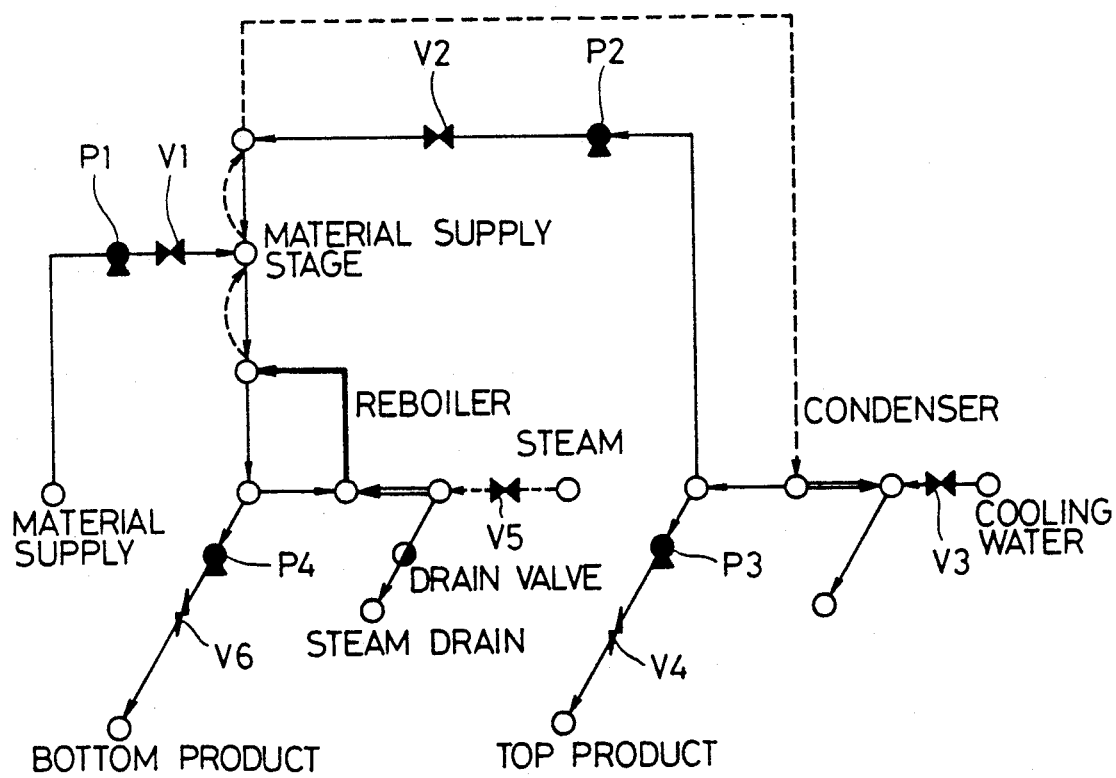
FIG. 5 is a diagram showing necessary pumps and valves added to the flowsheet of FIG. 4.

According to this embodiment, as shown in FIG. 5, it is necessary to provide a pump P1 between the inlet point for material supply and the material supply stage of the distillation column, a pump P2 in an intermediate portion of a fluid passage between the reflux tank of the condenser and the top of the distillation column, a pump P3 between this reflux tank and the outlet for a distillate, and a pump P4 between the bottom tank and the outlet for a distillate (bottom product) at the column bottom. Though not illustrated in FIG. 5, preliminary devices or protection lines have only to be added when needed by properly selecting such external-force using transportation means.

In the case of the distillation column system of this embodiment, the valves should only be arranged according to the following rules for example:

Rule 1: Dispose a valve on the discharge side of a pump in line for maintenance of the pump. It is to be noted that a valve may be omitted for a pump that pumps up a constant amount of the fluid.

Rule 2: Dispose a valve on the inlet side of heating steam for the reboiler, and a drain valve on the outlet side.

Rule 3: Dispose a valve at the inlet or outlet of cooling water for the condenser.

Rule 4: Dispose a valve in the outgoing line from the tank.

Rule 5: At least one control valve (CV) is required when multiple lines from the tank are connected.

FIG. 5 illustrates the arrangement of valves according to the above rules. It is to be understood that the types of valves depend on their usage and the type of the fluid.

Location of Hold-up

When the plant is operating at a steady state, the hold-up does not appear necessary. In view of a unsteady state process, such as start-up or shutdown operation, the hold-up is important in determining the execution timing of the plant operation procedure. In other words, the aforementioned "flow control" is executed by disposing the hold-up where necessary and controlling its quantity. In particular, it is necessary to provide the hold-up on the upstream side of a pump in order to ensure stable transportation of the fluid. Strictly speaking, the change in fluid phase normally does not occur at uniform speed, and is subject to fluctuation. In this respect, the hold-up is disposed at the location before the phase change takes place to thereby provide residence time for the flow and absorb fluid fluctuation. It is to be understood that the hold-up is provided to reserve the material liquid, the distillate (bottom product) at the column bottom, and the distillate (top product) at the column top.

Figure 6:
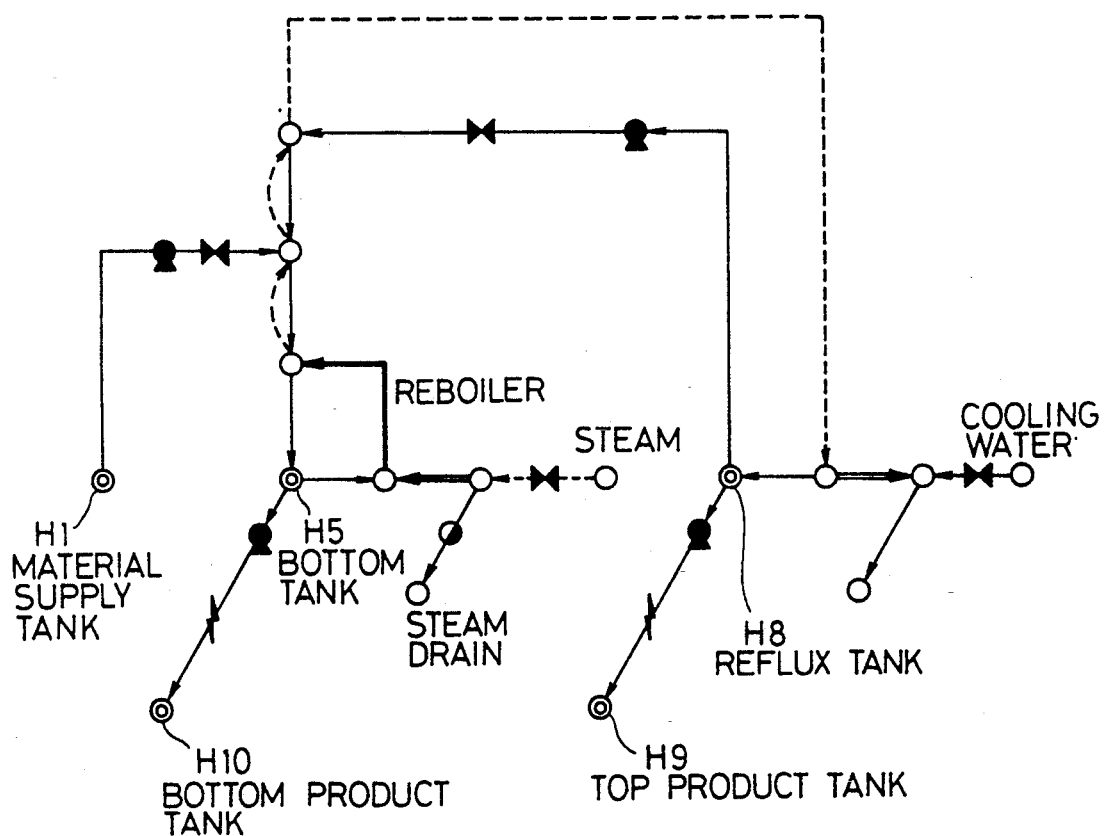
FIG. 6 is a diagram showing an arrangement for the hold-up.

FIG. 6 shows the hold-ups arranged from the above view points. A material supply tank H1 is disposed at the point from which a raw material is supplied, a bottom tank H5 at the bottom of the distillation column, and a reflux tank H8 on the distillate outlet side of the condenser. A top product tank H9 is located on the downstream side of the top distillate outlet, and a bottom product tank H10 is disposed on the downstream side of the bottom distillate outlet. In FIG. 6, these tanks are indicated by "◉".

Line Configuration for Start-Up Operation

Then, a line configuration for the start-up operation is investigated, and necessary lines are added. The so-called total reflux operation, circulation operation, and effluent operation are known as start-up operation strategies. From the economical point of view, as well as in light of shortening the start-up operation time, it is necessary only to examine the former two operations, i.e., the total reflux operation and the circulation operation, as the line configuration for the start-up operation.

Line Configuration for Total Reflux Operation

Figure 7:
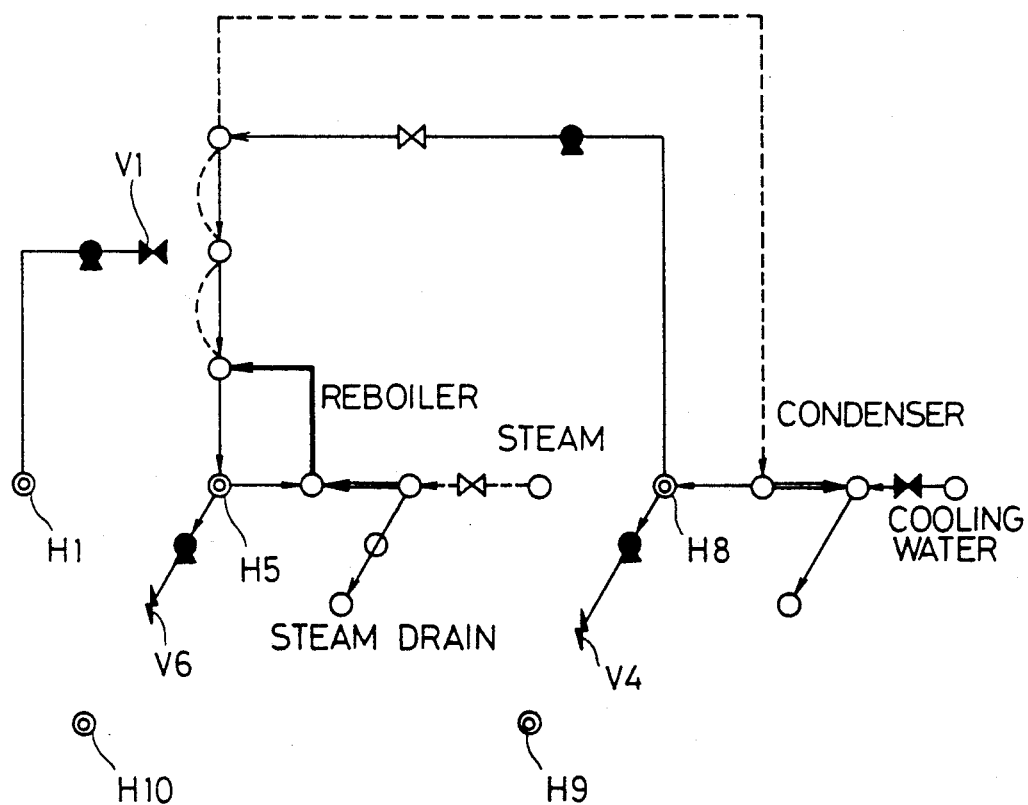
FIG. 7 is a flowsheet diagram showing a line configuration necessary for a steady-state transition operation with a total reflux at the time of a start-up operation.

For the total reflux operation, the material supply line, top distillate line, and bottom distillate line are cut off so that all the fluids flow back and the distillates from the reflux tank H8 and bottom tank H5 respectively have target compositions. Valves V1, V4 and V6 are provided on the respective lines to cut them off. As illustrated in FIG. 7, this operation strategy requires no additional equipment but simply the open/close operation of the valves for the reflux purpose.

Line Configuration for Circulation Operation

The circulation operation is an operation wherein the top and bottom distillates are returned to the material supply tank H1 and kept within the operation. For this operation, it is desirable to move to the total reflux operation when the top and bottom distillates reach a predetermined composition (temperature). However, start-up operation may be effected in the circulation operation until the distillates reach the desired composition (temperature). Recycle lines S20 and S21 which run from a top distillate line S12 and a bottom distillate line S14 back to the tank H1 are required as preliminary lines.

As the material supply tank H1, top product tank H9 and bottom product tank H10 are all located on the ground, pumps are needed to return the distillates from these tanks H9 and H10 to the tank H1. If the switching valves SV1 and SV2 are disposed on the downstream side of the valves V4 and V6, of the distillate lines S12 and S14, and the recycle lines S20 and S21 are branched from the valves SV1 and SV2 shown in FIG. 8, the distillates would be circulated back to the tank H1 by means of the pumps P3 and P4.

Through the above procedure, the basic plant design has been completed. It is preferable to investigate a changing line or by-pass line for inert gas for the start-up operation and, moreover, to examine a line configuration for emergency shutdown operation.

Figure 8:
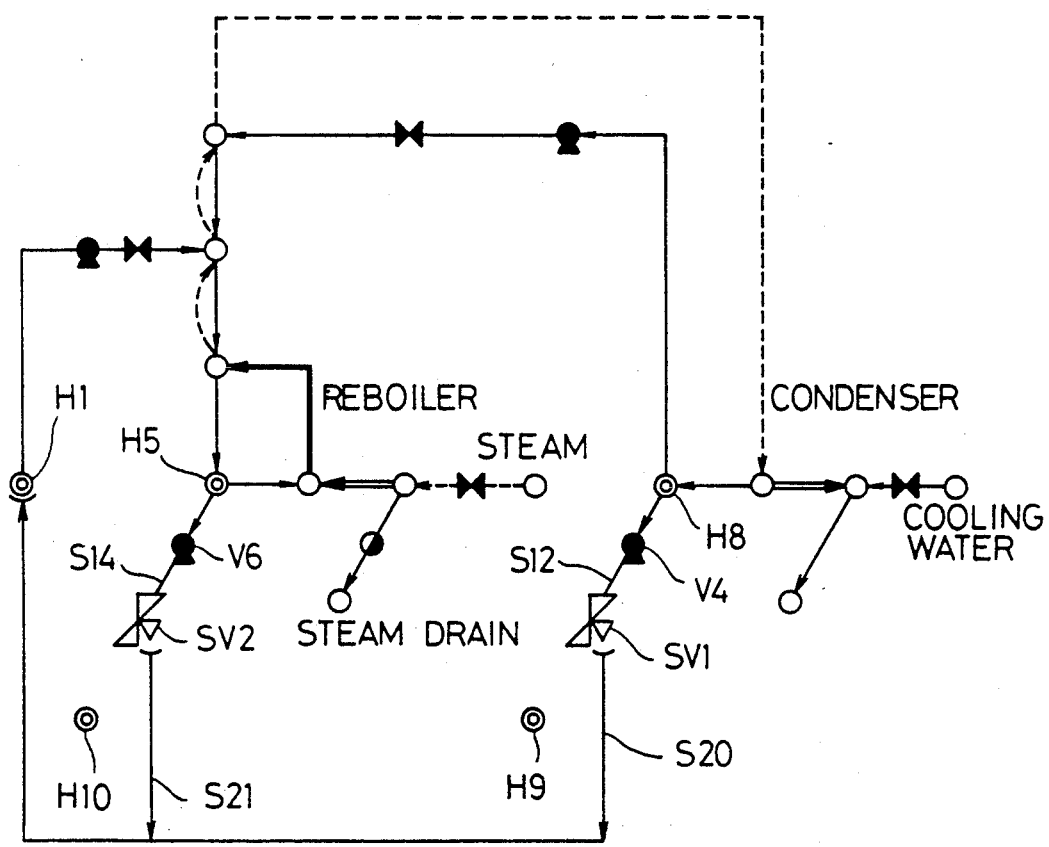
FIG. 8 is a flowsheet diagram showing a line configuration necessary for a steady-state transition operation with a circulation at the time of the start-up operation.
Figure 9:
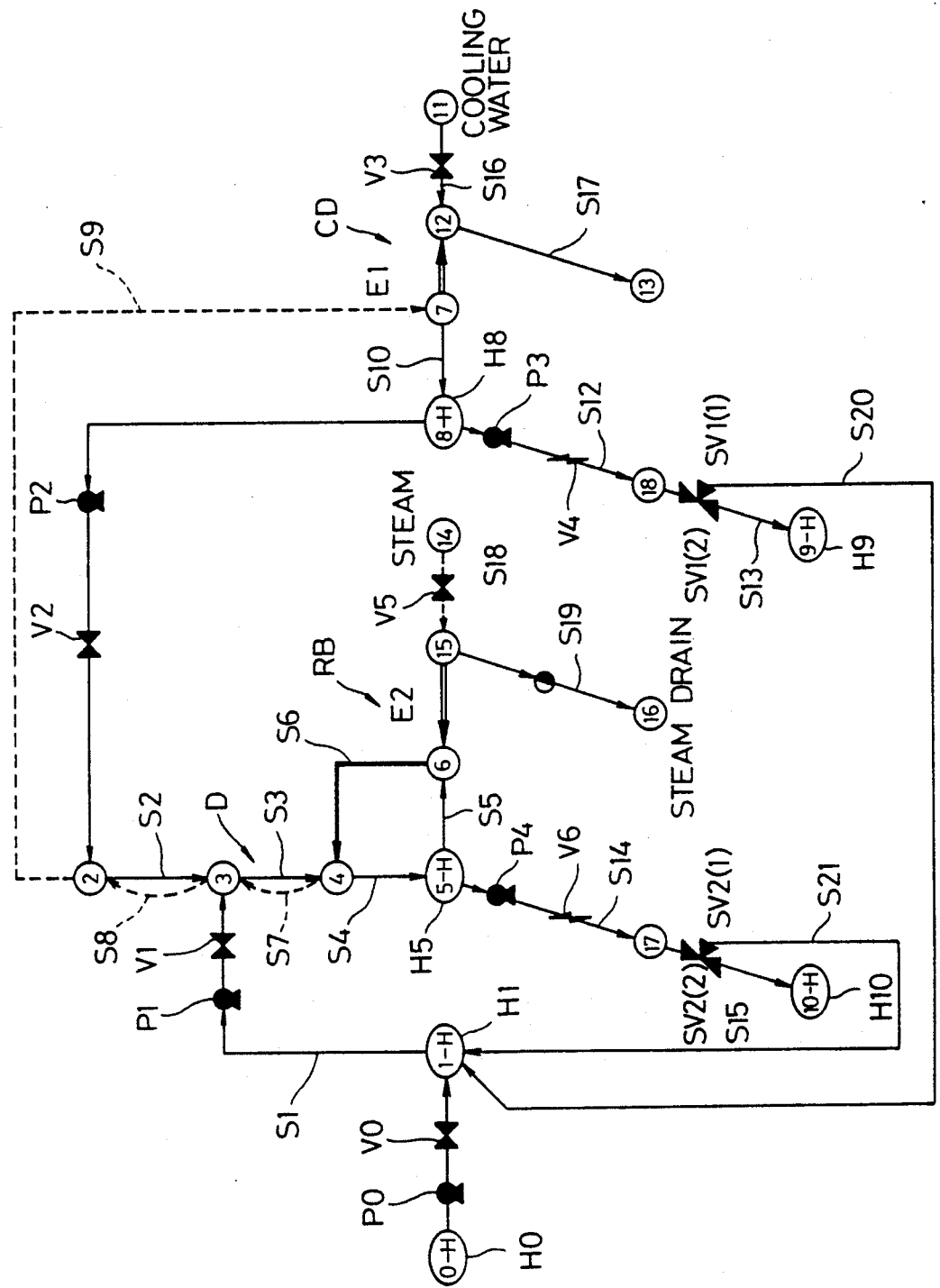
FIG. 9 is a diagram showing a node configuration of the distillation column system of the first embodiment.

FIG. 9 is the flowsheet of the thus designed distillation column system shown in FIG. 8 with reference numerals given to the nodes, processing fluid and valves. The nodes representing the individual nodes of the plant components include pipe junction point, part of a unit, a unit such as a heat exchanger which has no point to connect to other pipes, a unit such as a pump which utilizes external force, an internal node such as a hold-up, a system input node through which the process fluid or working fluid is externally supplied to this plant, and a system output node from which the fluid flows out of the plant. The process fluid is indicated by reference numeral "S1" or the like in contrast with the fluid flowing between the adjacent nodes. This reference numeral may be also regarded as an indication of the fluid passage through which the fluid flows between the nodes. In some cases the "fluid passage" means not only a pipe but also a column unit. Thus, a feature of the present invention lies in that the process fluid is associated with the fluid passage.

A supply line S0 to the material supply tank H1 is added. Here, "H0" denotes the system input node, that is a material reserving tank, and "P0" and "V0" respectively indicate a pump and a valve disposed on the supply line S0. The material reserving tank H0 includes a mobile tank unit such as a tank truck.

Figure 1:
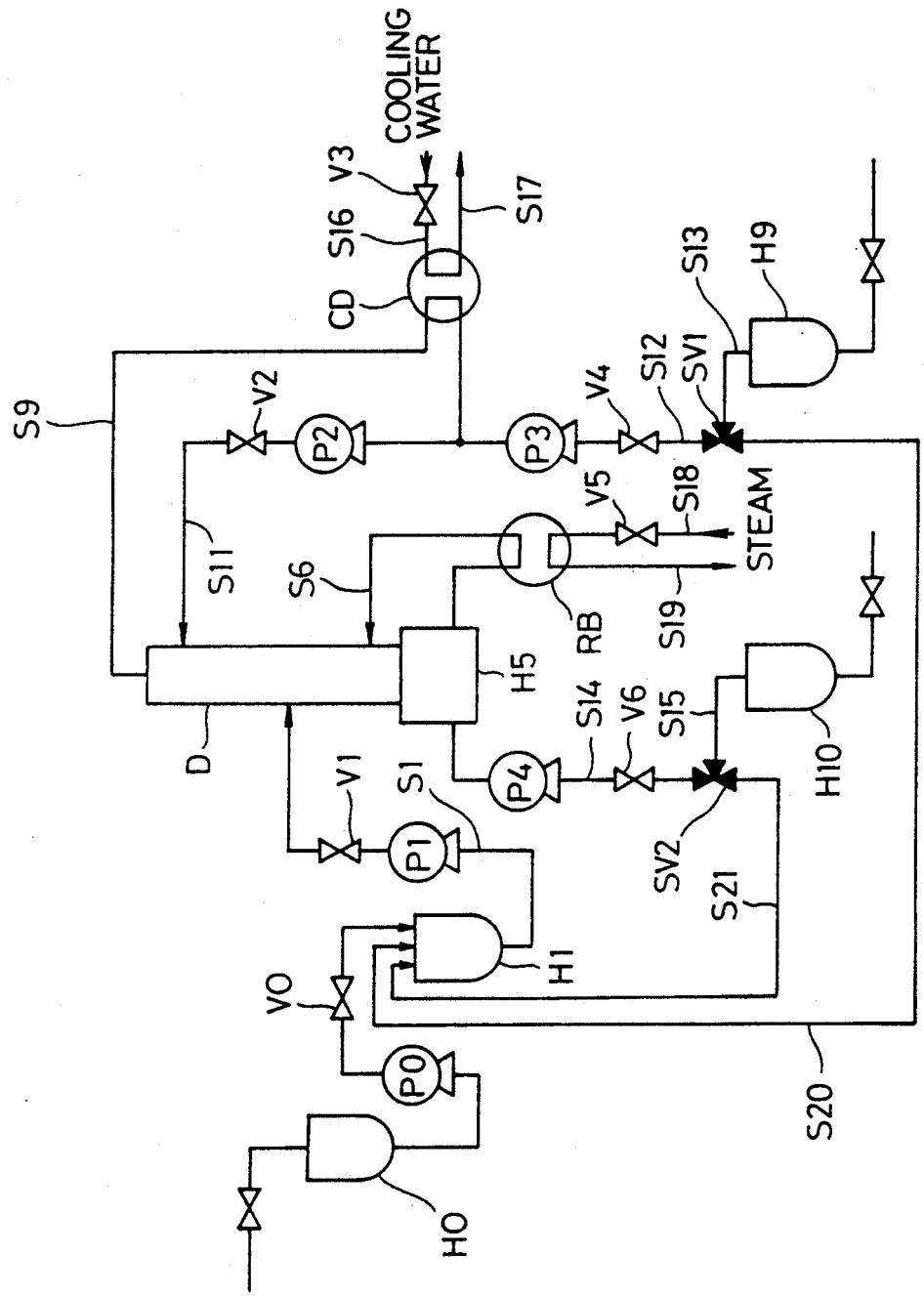
FIG. 1 is a schematic diagram showing a configuration of a distillation column system according to a first embodiment to which a plant activation tracking and display apparatus of the present invention is applied.

FIG. 1 is a schematic block diagram illustrating the distillation column system designed in the aforesaid manner. This system comprises a distillation column D, a reboiler RB, a condenser CD, reserving tanks, pumps and valves. Since like reference numerals are used to designate the components corresponding to the ones shown in the flowsheet of FIG. 9, a detailed description of those components will be omitted.

Figure 2:
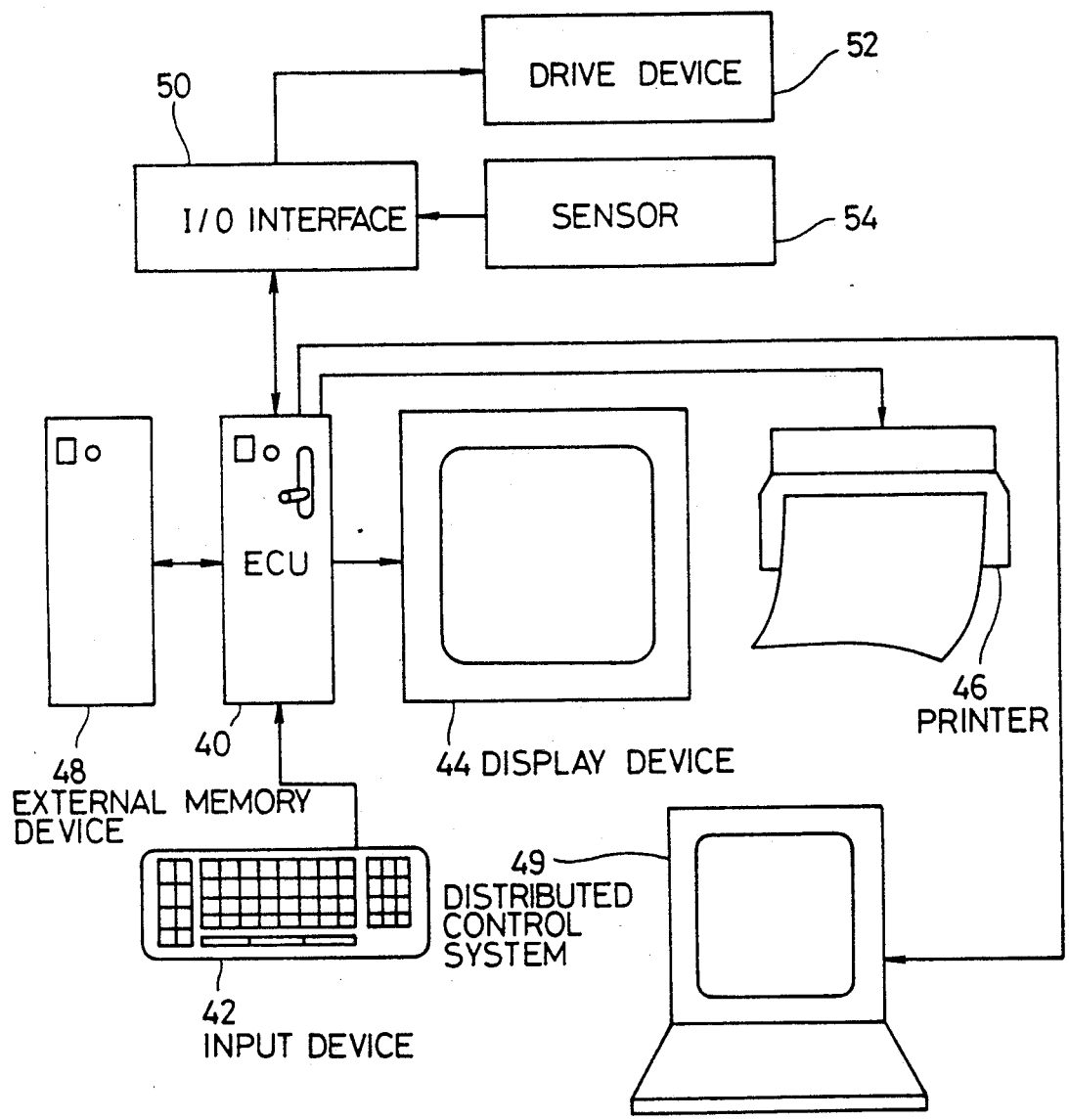
FIG. 2 is a schematic diagram showing a configuration of the plant activation display apparatus applied to a distillation column system.

The distillation column system according to the first embodiment is equipped with the plant activation display apparatus shown in FIG. 2. The display apparatus displays the plant operation procedure and the execution timing, so that operators execute the plant operations, such as the start-up operation, while monitoring what is on the display.

Configuration of Plant Activation Display Apparatus

The plant activation display apparatus comprises an electronic control unit (ECU) 40 for controlling the activation of the entire apparatus, an input device 42, a display device 44, a printer 46, an external memory device 48, an I/O interface 50, a drive device 52, and sensor means 54. The input device 42 serves to input the plant configuration and a plant activation command signal when its keys or switches are operated. The display device 44 displays the result of computation done by the electronic control unit 40 or the like on the screen. Likewise, the printer 46 prints out the computation result from the control unit 40. The external memory device 48 stores computing processes (program) or the like, which are to be executed by the control unit 40. The I/O interface 50 controls the input/output of the control unit 40. The drive device 52 opens or closes valves and drive pumps in response to a drive signal sent via the I/O interface 50 from the control unit 40. The sensor means 54 detects the hold-up level, column temperature, pressure, line flow rate, etc., and supplies them to the control unit 40 through the I/O interface 50.

The following is a description of the action of the plant activation display apparatus.

Preparation of Sequence Graph

Before describing the action of the plant activation display apparatus, a description will be given of how to prepare a sequence graph to be displayed on the screen of the display device 44 in the plant activation display apparatus, which is the fundamental technical concept of the present invention.

Representation of Fluid Connection and Conditions for Flow Control

It is believed that the procedure of the operations of the chemical plant, especially the start-up operation procedure, is basically determined by performing "flow control" and "hold-up control," while conforming to the conditions for safety and product quality. In other words, the fundamental technical concept of the present invention is based on the ideas of "flow control" and "hold-up control."

When the start-up operation is executed to set the chemical plant from an initial state to a target state or steady state, the "flow control" is to control the state of the fluid in each line or fluid passage between the adjacent nodes, starting with the system input node to the system output node, to thereby establish the target flow state from the initial state. According to the present invention, how to express the flow of the fluid in the plant is based on the knowledge that attention being paid to the phase state of the fluid, the operation procedure can naturally be represented if the fluid of the same phase is sequentially tracked from the nodes on the system input side to those on the system output side.

If the fluid in the same state is tracked from the nodes on the system input side, a change in phase of the fluid midway inhibits further tracking of the fluid from that point. This phase change results from heat exchange with the fluid or a large change in pressure on the fluid. If such heat exchange or a substantial pressure change occurs, the phase-changed fluid is considered to be continuous at the point of change. In this respect, the phase-changed fluid is tracked forward to the nodes on the system output side.

With hold-ups provided wherever required in the plant, the "hold-up control" is necessary to control the hold-up quantity for stable plant operations, particularly for ensuring stable operation timing. The "hold-up control" is applied to start and stop conditions of the valve operation, such as the valve operation starting when the hold-up quantity of the fluid flowing into the hold-up reaches a preset discrimination value. This discrimination value may vary according to the plant state, taking several proper values accordingly. For example, a discrimination value for drive a pump can be set different from the one after the steady state is reached. In other words, the discrimination value of the hold-up is considered to be a variable associated with the necessary start-up operation time and the quality control.

Based on the idea described above, all possible phase states of the process fluid that flows between the adjacent nodes in the flowsheet shown in FIG. 9, are categorized so that all possible fluid connections and conditions for flow control are given in the table

TABLE 1

| Stream No. | Node → Node | Phase | Energy | Pump | Valve |
|---|---|---|---|---|---|
| S0  | 0-H → 1-H  | L   |     | P0 | V0 |
| S1  | 1-H → 3    | L   |     | P1 | V1 |
| S2  | 2 → 3      | L   |     |    |    |
| S3  | 3 → 4      | L   |     |    |    |
| S4  | 4 → 5-H    | L   |     |    |    |
| S5  | 5-H → 6    | L   |     |    |    |
| S6  | 6 → 4      | V+L | +E2 |    |    |
| S7  | 4 → 3      | V   |     |    |    |
| S8  | 3 → 2      | V   |     |    |    |
| S9  | 2 → 7      | V   |     |    |    |
| S10 | 7 → 8-H    | L   | −E1 |    |    |
| S11 | 8-H → 2    | L   |     | P2 | V2 |
| S12 | 8-H → 18   | L   |     | P3 | V4 |
| S13 | 18 → 9     | L   |     |    | SV1(2) |
| S14 | 5-H → 17   | L   |     | P4 | V6 |
| S15 | 17 → 10-H  | L   |     |    | SV2(2) |
| S16 | 11 → 12    | L   |     |    | V3 |
| S17 | 12 → 13    | L   | +E1 |    |    |
| S18 | 14 → 15    | V   | −E2 |    | V5 |
| S19 | 15 → 16    | L   |     |    |    |
| S20 | 18 → 1-H   | L   |     |    | SV1(1) |
| S21 | 17 → 1-H   | L   |     |    | SV2(1) |

The following is a description of some of what are indicated by the above representation of fluid connections the conditions for and flow control shown in Table 1.

The process fluid S1 is a liquid L which flows to the node 3 (feed plate of the distillation column) from the node 1-H (material supply tank H1). The pump P1 is driven to make the liquid flow, which starts only when the valve V1 is opened.

The process fluid S3, a liquid L flowing from the node 3 to the node 4, runs without any external force.

The process fluid S6 is a mixture of gas and liquid (L+V) flowing from the node 6 to node 4. Since the phase of the fluid S6 changes from the liquid phase L to the mixed phase (L+V) before or after the node 6, an external heating energy +E2 is necessary at the node 6.

The process fluid S10 is a liquid L running from the node 7 to node 8-H (reflux tank H-8). Since the fluid S10 changes its phase from the vapor phase V to the liquid phase L around the node 8-H, an external cooling energy −E1 needs to be provided at the node 8-H.

The process fluid S15 is a liquid L which runs from the node 17 to the node 10-H (bottom product tank H-10). The fluid S15 starts flowing when the switching valve SV2 of the node 17 is set to the state (2).

TABLE 2

| | When ON condition is satisfied, activate and/or open. | | | |
|---|---|---|---|---|
| Stream No. | Operating Condition | Energy | Pump | Valve |
| S0  | [ON: < 1-H$^s$]  |    | P0 | V0 |
| S1  | [ON: > 1-H$^s$]  |    | P1 | V1 |
| S3  | [ON]             |    |    |    |
| S4  | [ON]             |    |    |    |
| S5  | [ON]             |    |    |    |
| S14 | [ON: > 5-H$^s$]  |    | P4 | V6 |
| S21 | [ON:             |    |    | SV2(1) |
| S6  | [ON: > 5-H$^s$]  | E2 |    |    |
| S7  | [ON]             |    |    |    |
| S8  | [ON]             |    |    |    |
| S9  | [ON]             |    |    |    |
| S10 | [ON:]            | E1 |    |    |
| S11 | [ON: > 8-H$^s$]  |    | P2 | V2 |
| S12 | [ON: > 8-H$^s$]  |    | P3 | V4 |
| S20 | [ON:]            |    |    | SV1(1) |
| S2  | [ON]             |    |    |    |
| S0  | [OFF > 1-H$^s$, > 5-H$^s$, > 8-H$^s$] | | | |

Table 2 shows preset conditions under which the process fluid can be produced, or operating conditions for valves and pumps. These conditions should be determined beforehand.

The condition to permit the process fluid S0 to flow (ON condition) is that the hold-up quantity of the hold-up H1 is smaller than a set value (1-H$^s$). At this time the pump P0 is activated and the valve V0 is opened. When the hold-up quantity of the hold-up H1 becomes greater than the set value (1-H$^s$), and when the hold-up quantities of the hold-ups H5 and H8 respectively become greater than set values (5-H$^s$) and (8-H$^s$), the pump P0 is stopped to set the process fluid S0 in an OFF state. If it takes much time to prepare the pumps, the pump P0 should be kept operating in an idling state.

The ON condition for the process fluid S1 is the hold-up quantity of the hold-up H1 greater than a set value (1-H$^s$). When the ON condition is satisfied, the pump P1 is activated and the valve V1 is opened.

The process fluid S3 is always in an ON state, which means that when it is supplied to the node 3, the fluid S3 drops by the force of gravity, thus creating a fluid flow.

With regard to the process fluid S6, when the hold-up quantity of the hold-up H5 becomes greater than a set value (5-H$^s$), steam is caused to flow to the reboiler to create the flow of the fluid S6. The reboiler should be warmed up so that the steam is supplied to the reboiler on starting the start-up operation.

TABLE 3

| Stream No. | State of Stream | Node → Node | State of Switching Valve | Condition for Transition |
|---|---|---|---|---|
| S15 | [ON | 17 → 10 | SV2(2) | #1] |
| S13 | [ON | 18 → 9  | SV1(2) | #2] |

Table 3 shows operating conditions for switching from the start-up operation to the steady-state operation. When the condition for the transition to the steady-state operation indicated by "#1" is fulfilled, the switching valve SV2 is set to the state (2) so that the process fluid S15 flowing from the node 12 to node 10 is rendered ON. When the condition for the transition to the steady-state operation indicated by "#2" is fulfilled, the switching valve SV1 is set to the state (2) so that the process fluid S13 flowing from the node 18 to node 9 is rendered ON. For the transition-to-steady-state conditions #1 and #2, each composition (temperature) of the bottom and top distillates should be at a set value (target value).

Figure 10:
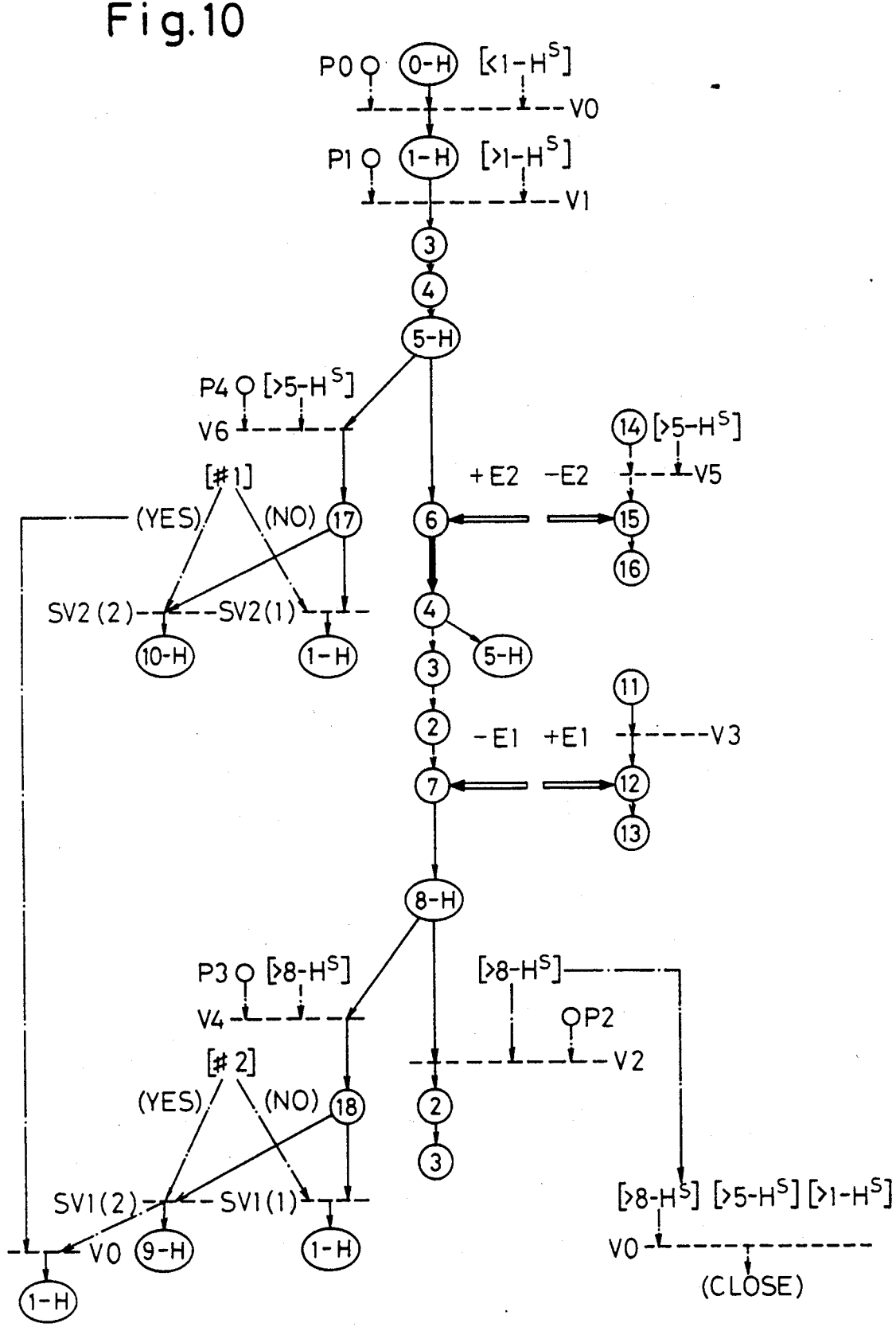
FIG. 10 is a sequence graph displayed on a display device 44 shown in FIG. 2.

When the aforesaid fluid connections and conditions for flow control are prepared, these pieces of information are inputted into the electronic control unit 40 through the key operation of the input device 42. When a computation start command signal is inputted to the control unit 40 through the input device 42 upon completion of the information input, the control unit 40 prepares a sequence graph based on the information shown in Tables 1 to 3. In accordance with the stored computation procedure, a graph is displayed on the screen of the display device 44. FIG. 10 illustrates a sequence graph for the start-up operation, which is the result of computation done by the control unit 40 and displayed on the display device 44.

Sequence Graph

The following is a description of the way the control unit 40 prepares this sequence graph on the basis of the computation result shown in FIG. 10.

It is easy for one skilled in the art to prepare a program so that the control unit 40 runs to obtain the sequence graph of FIG. 10 on the basis of the aforementioned fluid connections and conditions for flow control shown in Tables 1 to 3, and there are various ways to prepare the program, so that no particular discussion will be given to the details of the program preparation. The feature of the present invention lies in displaying a sequence graph which expresses the designed plant configuration, operation procedure and execution timing in a single flowsheet, not in how to prepare the computer software.

The sequence graph of the present invention indicates the individual points of the plant components by nodes, and shows their layout along the flow of the fluid in one direction on the screen or downward from the top of the screen in this embodiment, successively tracking the nodes from the system input node to the system output node on the basis of the phase state of the fluid. In the sequence graph shown in FIG. 10, at the input node of the body of the distillation column, there is a single node 0-H, which corresponds to the material reserving tank H0. At the output nodes, there are two nodes 9-H and 10-H, which correspond to the top product tank H9 and bottom product tank H10. There are input nodes 14 and 11 as well as output nodes 16 and 13 respectively in the reboiler and condenser, which constitute a heat exchanger.

This sequence graph is the contents of Tables 1 to 3 converted into a flowsheet according to the procedure presented below. First, the control unit 40 tracks the fluid of the same phase in order from the system input node to the system output node, on the basis of the input information given in Table 1. More specifically, with regard to the process fluid S0 of a liquid phase, this fluid of a liquid phase L flows from the node 0-H (the input node) and reaches the hold-up node 5-H passing through the nodes 1-H, 3 and 4 in the named order. The fluid is branched to two directions at the node 5-H; one part becomes the process fluid S14 and reaches the node 17. At the node 17 or the switching valve SV2, this fluid becomes either the process fluid S15 or S21 in accordance with the switching state of the valve SV2, reaching the node 10-H or returning to the input node 1-H accordingly.

The other fluid branched at the hold-up node 5-H becomes the process fluid S5 which reaches the node 6. At the node 6 the fluid S5 changes its phase due to heating energy ($+E2$) from the reboiler to have a mixed phase of the vapor phase V and liquid phase L. When there occurs heat exchange, the process fluid is considered to be continuous according to the aforementioned rules. The fluid S6 of the mixed phase moves from the node 6 to the node 4. At the node 4, the fluid S6 is divided into two phases. A liquid portion becomes the aforementioned process fluid S4, which reaches the hold-up node 5-H again, a gaseous portion becomes the process fluid S7, which rises up by the force of gravity (density difference) and reaches the node 7 of the condenser passing through the nodes 3 and 2 in the named order. During this period, the fluid S7 keeps the vapor phase, and the flow is indicated by the broken line in the flowsheet.

At the node 7 the heat ($-E1$) of the fluid is removed by the cooling water, causing the phase transition from the vapor to liquid. In this case the process fluid is also considered to be continuous because of the heat exchange, so that it becomes the process fluid S10, reaching to the hold-up node 8-H or the reflux tank H8. The fluid is divided into two portions at the node 8-H. One becomes the process fluid S11 of a liquid phase L, which returns to the node 3 through the node 2, and the other becomes the process fluid S12, which reaches the node 18. The fluid S12 becomes either the process fluid S13 or S20 in accordance with the switching state of the switching valve SV1, the former reaching the output node 9-H and the latter returning to the input node 1-H.

The stream fluid S18 of a vapor phase comes from the input node 14 of the reboiler and reaches the node 15 via the valve V5. This fluid changes its phase here and reaches the output node 16. The cooling water S16 of a liquid phase from the input node 11 of the condenser reaches the node 12 via the valve V3. After heat exchange there, the resultant fluid reaches the output node 13.

Various symbols in the sequence graph will now be explained. The structural nodes are denoted by circles (◯) including ellipses. What is included in the structural nodes is as described before (see FIG. 9). The conditions for hold-up control and various decision conditions are contained in brackets "[]". The decision conditions may additionally include various conditions, such as the ones for the transition from the start-up operation to the steady-state operation, besides the hold-up quantity and the liquid level. It is to be understood that all the possible decision conditions according to this embodiment are taken into consideration at the stage of the preparation of Tables 1 to 3, as described before.

Although the valves are normally closed in the initial state, the operation sequence may go close →open →close . . . , depending on the situation. Therefore, the word or symbol "CLOSE" is added to indicate the closure of each valve. This symbol can be displayed with varying brightness on the screen; it may be dark when the values is closed, and bright when the valve is open, for example.

The directions of flow are indicated by the arrows in FIG. 10, and the broken lines drawn perpendicular to the flow as if to shield the flow indicate the activation of valves, heating or cooling, pumps, and compressors. If every node having a flow which directly enters this activation and the decision conditions are marked, the activation can start. For instance, the first activation appearing as viewed from the top of the flow in FIG. 10 indicates the activation of the valve VO, and the decision condition for opening this valve is the hold-up quantity equal to or smaller than a set value $1-H^S$. If this condition is fulfilled with the pump PO prepared, every flow directly entering this activation is marked, allowing the valve VO to be opened. Particularly, when the time-involved valve operation, such as the opening speed, is important, the activation may be indicated by the double broken line, with a time condition affixed between the two broken lines.

The aforementioned flow includes the flow of heat (indicated by the double real line as described before) and the flow of information in addition to the flow of a material such as a fluid of a mixed phase. As the information includes information representing that the decision condition for hold-up control, the decision condition concerning the process flow, etc., the flow of information is indicated by the broken line connecting the decision condition given in the brackets "[ ]" and the activation, the arrowhead showing the direction. Although the material flow and the heat flow are indicated by the same types of lines as described before (see FIG. 3), they may be colored differently or expressed by different lines for distinction.

The aforementioned marking is made in a manner such that when the decision conditions concerning a node having a flow, the hold-up control, and the process flow are fulfilled, this node and the decision conditions are indicated with an increased brightness on the screen as aforesaid. Instead of changing the brightness, color may be changed. Normally, when a valve is closed, the material flow (heat flow) through this valve is inhibited. In other words, the mark on the node, which is associated with the material flow (heat flow) and is joined to the flow created by the activation of that valve, disappears. When there is a recycle loop of a material flow on the downstream side of the activation associated with the closed valve, the material flow in the loop may continue in some cases. In this case, the mark on the node in the loop will not disappear.

The aforementioned sensor means 54 always monitors and checks whether or not the decision condition concerning the hold-up control and the state of the process flow is fulfilled. More specifically, the sensor means 54 always detects the liquid level of a hold-up or the hold-up quantity, the temperature or pressure at each position in the distillation column, the composition of a distillate, etc., and sends a detection signal through the I/O interface 50 to the control unit 40. From this detection signal, the control unit 40 determines whether or not the decision conditions associated with the hold-up control and the process flow are fulfilled.

The following is a description of how to perform the start-up operation of the plant activation display apparatus and how to determine the execution timing while monitoring the sequence graph. As the initial condition, a material is reserved in the material reserving tank H0 and the hold-up quantity of the other hold-ups is zero. In addition, the preliminary operation for the start-up of the pumps and reboiler RB have already been completed, and the switching valves SV1 and SV2 have been set to the state (1). Also, the pumps and valves can all be remotely operated in response to an ON drive command signal sent to the drive device 52 from the control unit 40 through the switching or key operation of the input device 42 of the plant activation display apparatus. It is to be understood, however, that the pumps and valves may be also manually operated as needed by operators, or may be manually operated for the ON operation and automatically disabled by the control unit 40 at the time of the OFF operation or emergency shutdown operation.

Further, when the activation switch of the distillation column system is set ON, the hold-up O-H and the control condition $[<1-H^s]$ are marked in the sequence graph on the screen of the display device 44. The nodes 14 and 11 are also marked and emphatically indicated. An operator sets the operation switch of the pump P0 ON after confirming the mark indication in the sequence graph. The valve V5 of the reboiler RB is opened when the hold-up quantity of the bottom tank H5 reaches a set value. Then, when the valve V3 is opened, the nodes 11 to 13 of the condenser CD are all marked. These valves V3 and V5 may be activated at a preliminary operation stage if such an operation is safe and entails no problems on the apparatus.

Activating the pump P0 also marks the pump node P0. As a result, every flow going through activation to the valve V0 has been marked, satisfying all the decision conditions for the valve V0, so that the valve V0 can be opened. The control unit 40 sends the ON drive signal through the drive device 52 to the valve V0 and opens the valve. Consequently, a material fluid flows from the reserving tank H0 to the material supply tank H1, the hold-up node 1-H is emphasized or marked on the display screen.

The activation concerning the valve V1 is held until a predetermined amount of the material fluid is supplied to the supply tank H1. At this time, the pump P1 is idling and is thus marked. When the hold-up quantity of the tank H1 reaches a set value, the decision condition is marked and every flow going through activation has been marked. Consequently, the control unit 40 sends the ON drive signal through the drive device 52 to the valve V1 and opens the valve. As a result, a flow to the next activation is formed, and every node up to each activation associated with the valves V6, V4 and V2 is marked. Actually, because no flow of the process fluid S6 by the reboiler RB substantially occurs unless the hold-up quantity of the bottom tank H5 reaches the vicinity of a set value, the fluid dropping in the bottom tank H5 of the distillation column is reserved there.

When the hold-up quantity of the bottom tank H5 reaches the set value, the decision condition is marked. Confirming this mark, the operator activates the pump P4, marking every flow going to each activation associated with the valve V2, and opening the valve V6. When the valve V6 is opened, the switching valve SV2 remains at the state (1) since the distillation column system has not reached the steady state yet. The fluid from the bottom tank H5 therefore returns to the supply tank H1 through the reflux line S21.

When the hold-up quantity of the bottom H5 reaches the set value, the valve V6 of the reboiler RB is opened and heating of the process fluid by steam starts. The distillate component then reaches the node 7 passing through the nodes 4, 3 and 2 in the named order, and is cooled and condensed there by cooling water. The resulting fluid flows in the reflux tank H8.

The activation associated with the valves V4 and V2 is held until the hold-up quantity of the tank H8 reaches a set value ]8-H$^s$]. When the hold-up quantity reaches this set value, the pump P3 is activated and the valve V4 is opened. As a result, part of the distillate in the reflux tank H8 returns the supply tank H1 via the switching valve SV1, which is rendered in the state (1). The pump P2 is activated and the valve V2 is opened, permitting part of the distillate of the tank H8 to return to the top. When the hold-up quantity of the tank H8 reaches the set value and all the decision conditions indicate that the hold-up quantities 5−H and 1−H are equal to or greater than their respective set values, then the valve V0 is closed and the apparatus is ready to shift to the steady-state operation in the circulation system.

The sensor means 54 always monitors the compositions, temperature, etc. of the bottom and top distillates. When the compositions (temperature or the like) of the distillates reach target values and the conditions #1 and #2 for the steady-state operation are fulfilled (YES), the associated switching valves SV1 and SV2 are switched to the state (2). As a result, the top and bottom distillates circulating to the hold-up node 1-H start being retained in the respective tank H9 and H10, and the mode shifts to the steady-state operation.

At the initial stage of the start-up operation, the process fluid is circulated by the circulation operation strategy until the compositions of the bottom and top distillates of the hold-up nodes 5-H and 8-H reach the target values (temperature), thus shortening the start-up operation time.

To further shorten the start-up operation time, the valves V1, V4 and V6 may be disabled when the sensor means 54 detects that the compositions (temperature, etc.) of the bottom and top distillates have reached the set values, thus ensuring recycling of the distillates of the bottom and top hold-ups H5 and H8 with the total reflux operation strategy. Also in this case, when the compositions (temperature, etc.) of the bottom and top distillates reach the target values, the valves V1, V4 and V6 are reopened, and the switching valves SV1 and SV2 are set to the state (2), thus ensuring the transition to the steady-state operation.

Further, if products are put into the top and bottom hold-ups H8 and H5 before the start of the start-up operation, and if the start-up operation is started according to the total reflux system, the start-up operation time can be further shortened.

Figure 11:
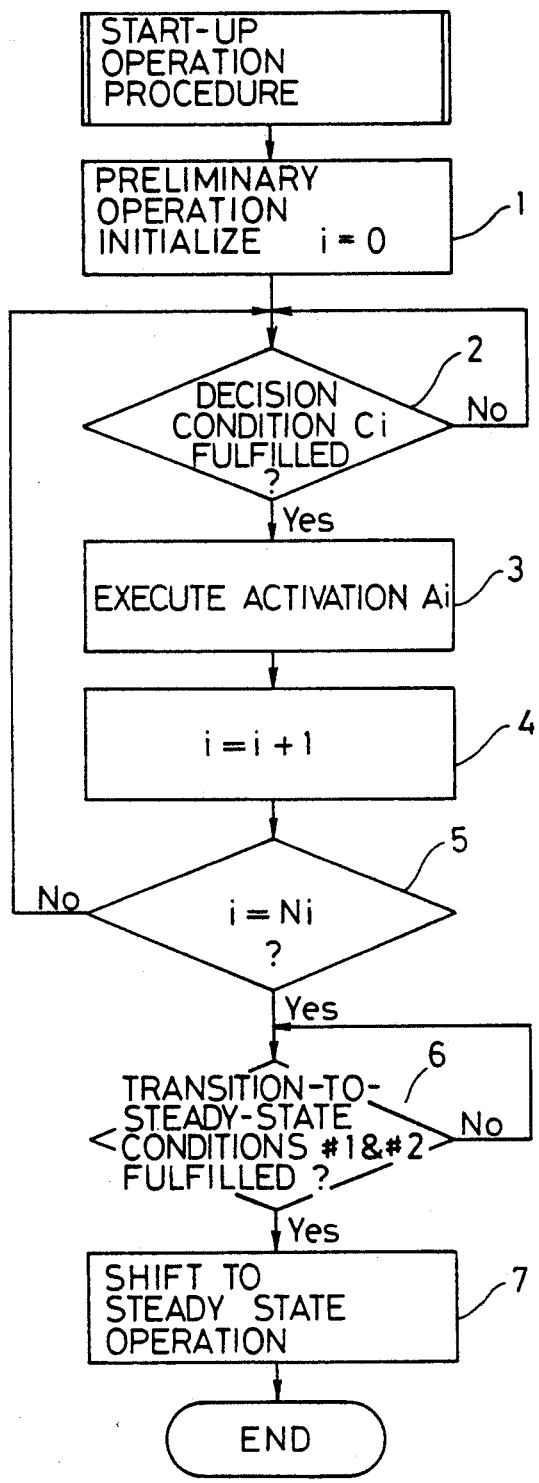
FIG. 11 is a flowchart illustrating steps of procedure of the start-up operation executed by means of an electronic control device 40 shown in FIG. 2.

The start-up operation procedure can be described in brief with reference to the flowchart of FIG. 11. Various preparation jobs and the initialization of the control unit 40 are performed (step 1). Then, it is determined whether or not the first decision condition Ci of the sequence graph is satisfied, and the process holds until the condition is fulfilled (step 2). When the decision condition Ci is fulfilled in step 2, the activation Ai is executed (step 3).

The execution of the activation Ai creates a flow to the next activation Ai+1, and the individual nodes up to the activation Ai+1 in the sequence graph are marked and emphasized. Then, the control variable i is incremented by "1" in step 4. It is then determined whether or not i has reached a predetermined value Ni (step 5), and the operation returns to step 2 to determine whether or not the decision condition for the next activation is fulfilled. The individual activations are sequentially executed in this manner. When execution of the (Ni−1)-th activation is completed, the operation advances to step 6 to wait for the transition-to-steady-state conditions #1 and #2 to be fulfilled. When these conditions #1 and #2 are fulfilled, the operation for the transition to the steady state is executed (step 7), completing the start-up operation.

Sequence Graph for Shutdown Operation

When the shutdown operation of the distillation column system is performed after the steady-state operation, the aforementioned sequence graph for the start-up operation can be used as it is. What should be considered for the shutdown operation are safety and the quality of the fluid remaining as a hold-up. The shutdown operation is to inhibit part of the flow conditions for the steady-state operation included in the sequence graph for the start-up operation. Since the equipment required for the start-up operation can be used directly, it may be unnecessary to provide a particular equipment for the shutdown operation, i.e., the structure of the equipment for the shutdown operation is the same as the one required for the start-up operation.

Thus, the shutdown operation procedure should only be sequentially executed according to the execution timing displayed on the screen of the display device 44, using the sequence graph used for the start-up operation. In many cases, the shutdown operation procedure, unlike the start-up operation procedure, does not create the flow "from material supply to product."

In the case of the distillation column system of this embodiment, the valve V1 is closed and the pump P1 is activated to stop the supply of the raw material, then the valve V5 is closed to cut off steam which has been supplied to the reboiler RB. At the same time, the switching valves SV1 and SV2 are set to the state (1) to suppress the top and bottom products and increase the amount of reflux. When the process fluid is sufficiently cooled down, the valve V3 for supplying cooling water is closed, thus completing the shutdown operation.

The operation procedure and execution timing can be indicated one after another to the operator if the subsequent activations are sequentially blinked using the same sequence graph as used for the start-up operation.

Sequence Graph for Emergency Shutdown Operation

In general, since safety has the highest priority in the emergency shutdown operation procedure, equipment designed for emergency shutdown is often added to the plant for safety's sake, and the operation sequence graph is prepared in accordance with the added line configuration. The additional equipment may be one for discharging the fluid from the main plant component or one for supplying sealing gas for prevention of explosion. Although the emergency shutdown operation procedure, in contrast with the case of the start-up operation, never creates the flow "from material supply to product," it may be represented by the same method for the shutdown operation. Although a line for fluid transportation should be added to the main process line to supply an additional fluid or eliminate the process fluid, the additional line basically can be expressed by the same way as used for the start-up operation, facilitating the preparation of the sequence graph. To permit the additional equipment to forcibly discharge the process fluid, it is preferable to give particular consideration to the distinction between the node at where the main process line is joined to the discharging equipment, and other nodes by means of affixing special symbols, coloring or the like.

The aforementioned plant activation display apparatus can ensure fully automatic start-up and shutdown operations if all the pumps and valves are driven under the control of the electronic control unit 40. That is, the plant activation display apparatus of the present invention can be used as an automatic operation apparatus.

Use as Simulation Support Apparatus

The plant activation display apparatus according to the above-described embodiment of the present invention, as applied to a distillation column system, is effective not only as an apparatus to inform an operator of the start-up, shutdown, or emergency-shutdown operation procedure and execution timing of a real model, but also as a design support tool to design a plant in the light of the operation procedure and the execution timing. This plant activation display apparatus is also effective as a simulation support apparatus for training operators to how to operate the real mode.

To use the plant activation display apparatus as a simulation apparatus, the sensor means 54 of the plant activation display apparatus shown in FIG. 2 should only be replaced with a simulation signal generator, which generates pseudo signals indicative of status quantities, such as the flow rate, pressure, temperature, composition, etc. of the process fluid at various points in the distillation column, the reboiler RB and the condenser CD, or in the hold-ups, the generator being connected to the control unit 40 through the I/O interface 50. When the pumps and valves are operated, changes in the status quantities of the process fluid caused by the operation are estimated and supplied to the control unit 40 in succession.

Also when the plant activation display apparatus is used as the simulation apparatus, as in the aforesaid case where it is applied to the real model, the evaluation of the activation performance, such as the operating efficiency of the designed plant, and the study or learning of the plant operation can be facilitated by displaying the sequence graphs on the screen of the display device 44, and operating the apparatus according to the instructions of the emphasized activations.

Second Embodiment

Figure 12:
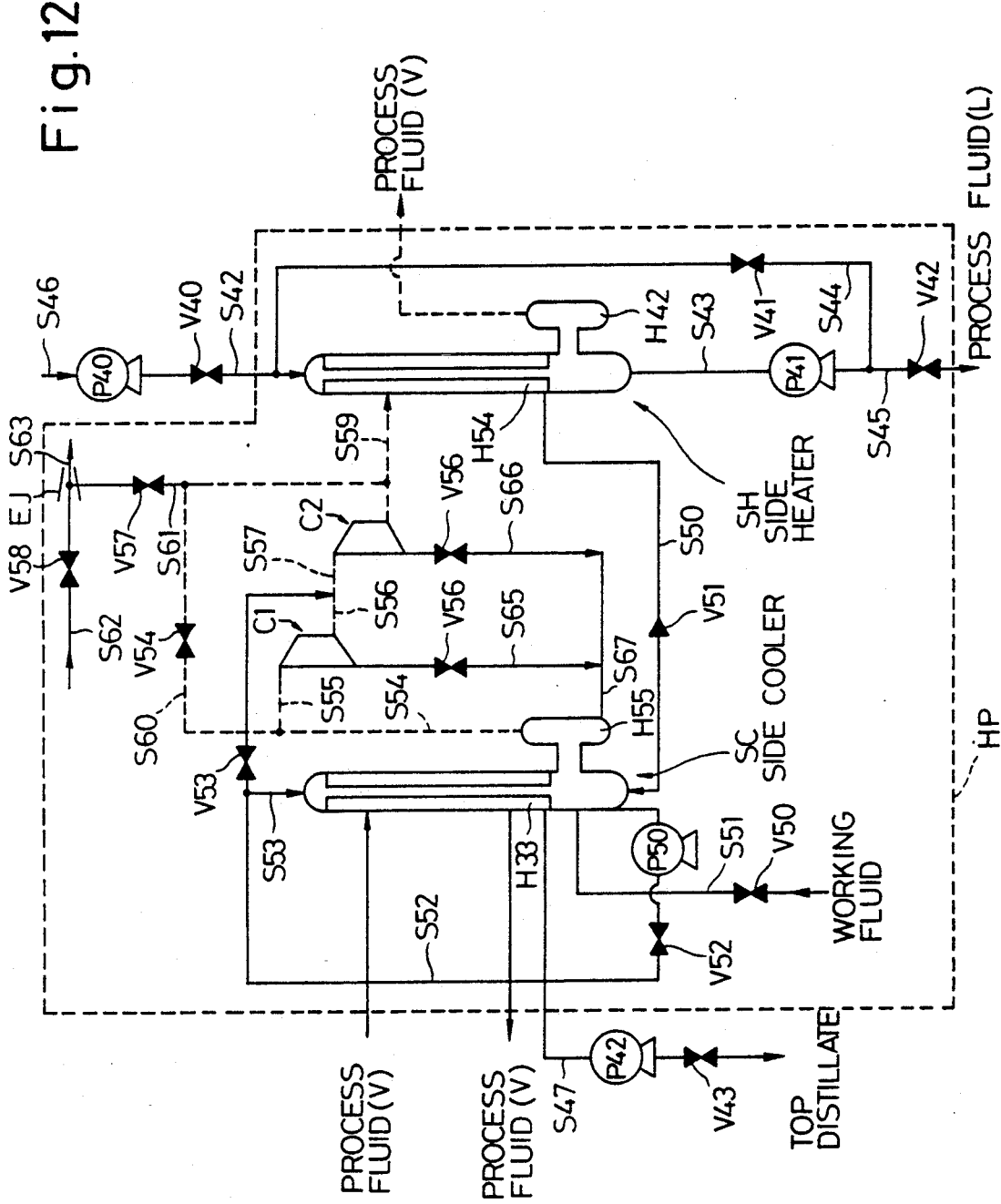
FIG. 12 is a block diagram showing a configuration of a heat pump connected to a distillation column system according to a second embodiment to which the plant activation tracking and display apparatus of the present invention is applied.

The sequence graph displayed on the screen of the plant activation display apparatus of the present invention can be also applied to a combined unit which is formed of a plurality of units. If the basic units are of high modularity, in particular, the graph can be applied more easily. Since the structure of the plant corresponds to the procedure of operation, changed portions of the operation procedure can be cleared up correspondingly by detecting modified structure portions necessary for the connection of two units. The following is a description of a distillation column system with a heat pump according to a second embodiment, as an example of the aforesaid arrangement. In FIG. 12, like reference numerals used to denote the lines (fluid passages) of the first embodiment refer to corresponding fluids.

Line Configuration of Heat Pump

The distillation column system of the second embodiment is a combined system obtained by connecting a heat pump HP, which uses water as a working fluid (heat transfer medium), to the distillation column system of the first embodiment. FIG. 12 shows a line configuration of a heat pump unit applied to this distillation column system.

The heat pump HP includes two heat exchangers (side cooler and side heater) SC and SH which are falling film-type heat exchangers. The side cooler SC removes condensation heat from a process fluid, and gives the heat to the water for use as a working fluid, thereby vaporizing the water. The side heater SH gives condensation heat from the working fluid to the process fluid, thereby evaporating part of the process fluid. Hold-ups H55 and H54 for collecting the cast working fluid are attached to the bottom portions of the side cooler SC and the side heater SH, respectively. The heat pump HP is provided with compressors C1 and C2 for boosting the temperature of the vaporized working fluid and a decompressor V51, besides the heat exchangers.

To increase the wet area of their heat transfer surfaces, the side heater SH and the side cooler SC are provided with a process fluid circulation line S44 and working fluid circulation lines S52 and S53, respectively. Each combination of circulation pump and valve P41, V41, and P50, V52, and V53 is arranged in the individual circulation line.

A line for introducing the working fluid (water) is required as preliminary equipment for the operation of the heat pump HP. For example, a fluid injection pipe S51 is attached to the side cooler SC. The working fluid is heated to be evaporated by means of the process fluid in the side cooler SC, and is then delivered to the side heater SH through the compressors C1 and C2. In the side heater SH, the working fluid is condensed and collected in the hold-up H54. A pipe S60 for reducing starting load is required for smooth activation of the compressors C1 and C2. The pipe S60 is provided with a valve V54 which closes the pipe S60 during the steady-state operation. Drain lines S65, S66 and S67 are provided to be used to remove the working fluid condensed around the compressors C1 and C2. Further provided are exhaust lines S61, S62 and S63 for removing air introduced into the heat pump HP and a working fluid sprayer (S64, V53) for prevention of superheating.

Modification of Line Configuration of Distillation Column & Heat Pump

The heat pump HP is disposed in an intermediate stage between the condenser CD and distillation column D of the first embodiment so that the two heat exchangers SC and SH are individually in contact with the column-side process fluid across their respective heat transfer surfaces. Therefore, the distillation column D and the heat pump HP require a structural modification for the connection between them. Table 4 collectively shows the details of junctions between the distillation column D and the heat pump HP.

TABLE 4

| | Distillation Column Side (phase of fluid) | | HP side (phase of fluid) |
|---|---|---|---|
| 1) | Column top output (G) | → | SC input (G) |
| | Reflux tank input (L) | ← | SC output (L) |
| | Condenser input (G) | ← | SC output (G) |
| 2) | Intermediate stage of recovery section | | |
| | Output (L) | → | SH input (L) |
| | Input (L) | ← | SH output (L) |

TABLE 4-continued

| Distillation Column Side (phase of fluid) | HP side (phase of fluid) |
|---|---|
| Input (G) | ← SH output (G) |

In consideration of the relationships between the respective height positions of the two opposite ends of each connecting line, it is necessary only that a pump P42 and a valve V43 be arranged in a line S47 on the output side of the side cooler SC, a pump P40 and a valve V40 be arranged in a line S41 on the process-fluid input side of the side heater SH, and pipelines for associated utilities be added, for use as necessary transportation apparatuses.

Line Configuration for Start-Up Operation

The following is a description of a necessary line configuration for the start-up operation of the distillation column system with the heat pump. First, the circulation system described in connection with the first embodiment is used, and in this case, piping is required to return the products from the top and bottom of the column to a material supply tank H1.

A hold-up 33-H is provided between the top of the column and the node 7 in addition to the hold-up of the distillation column system according to the first embodiment. The hold-up 33-H is used to receive the process fluid flowing down from the top side of the distillation column, and deliver it to the side of the heat pump HP.

Figure 13:
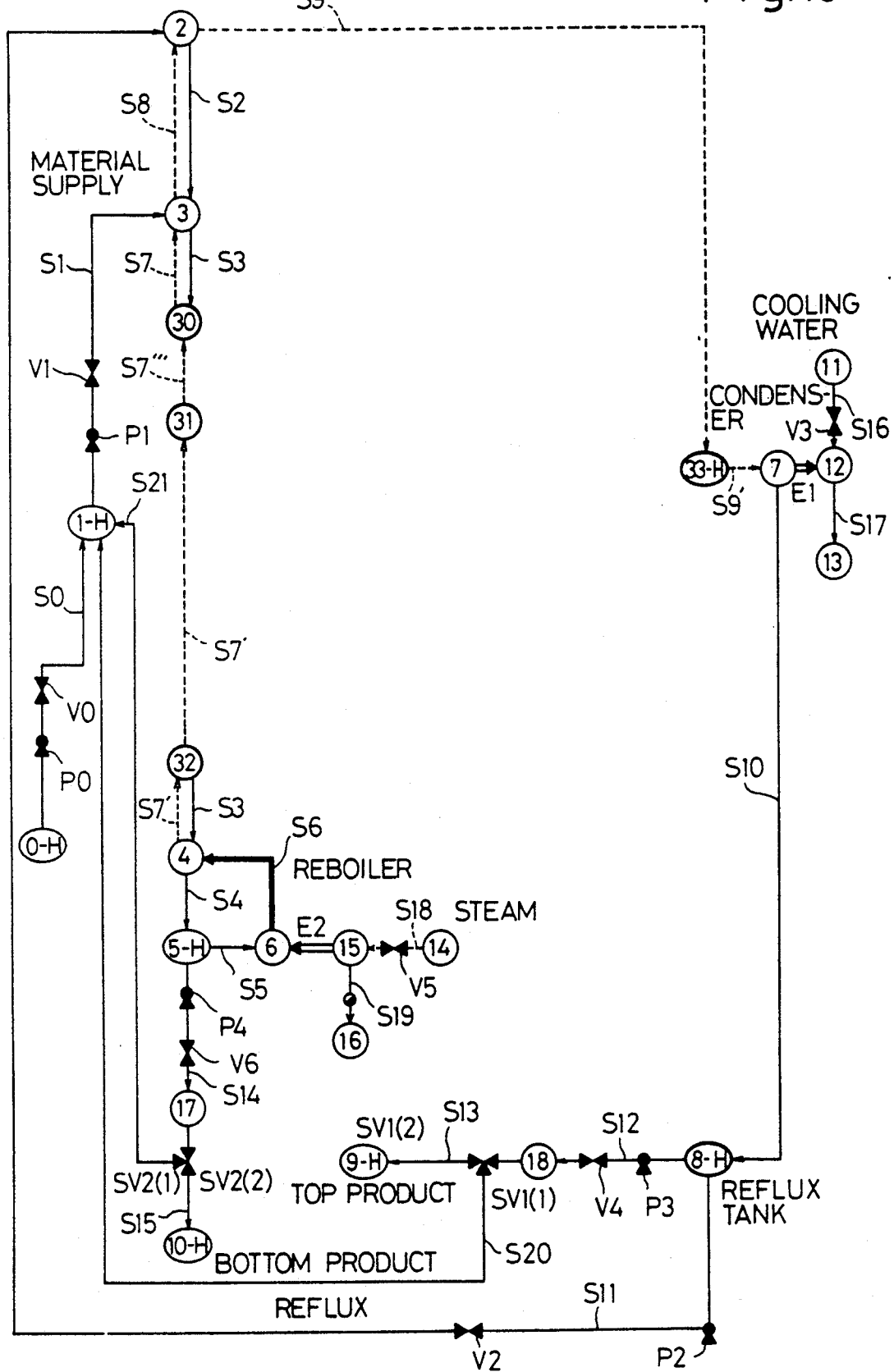
FIG. 13 is a diagram showing a node configuration on the distillation column side according to the second embodiment.
Figure 14:
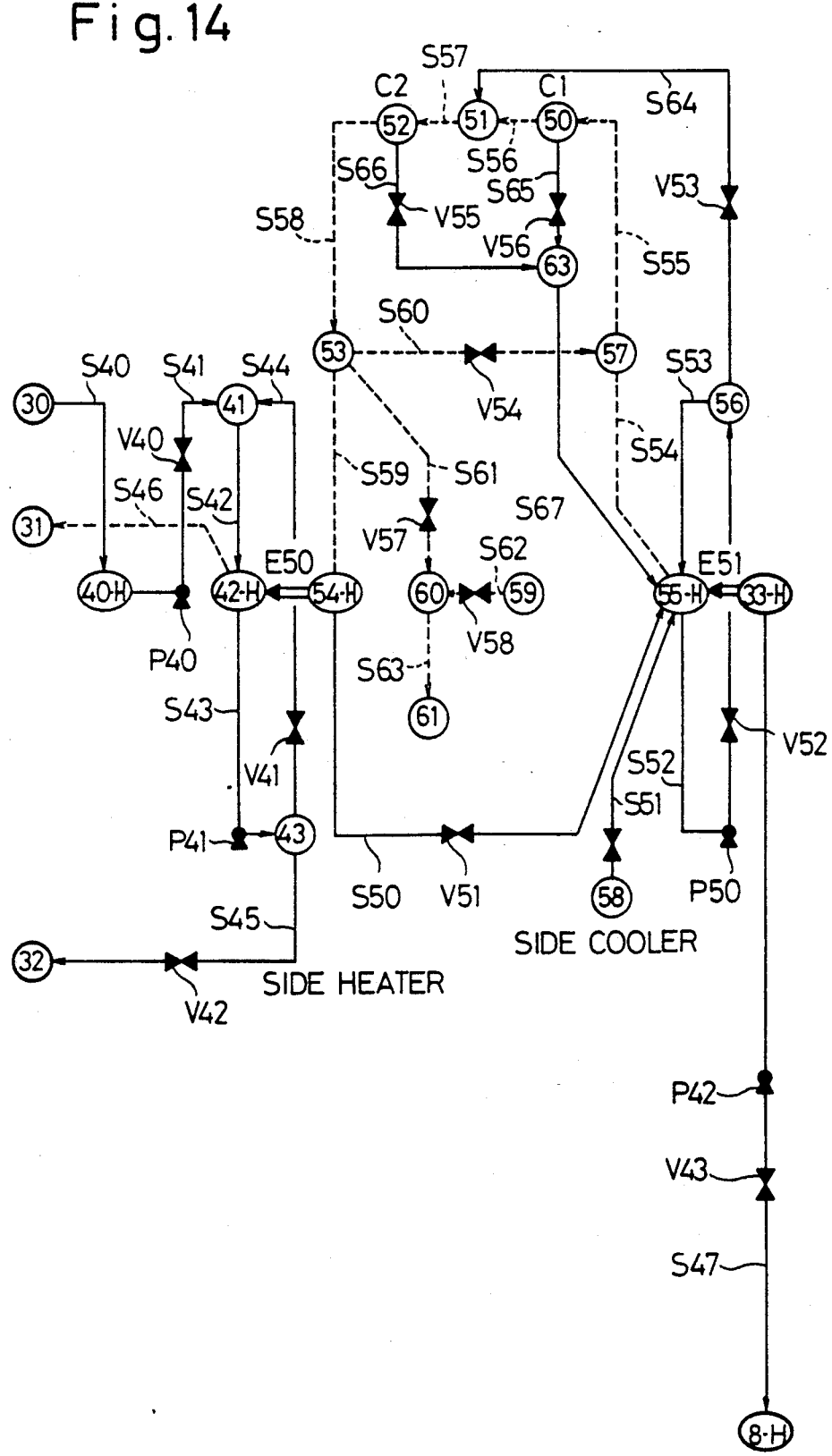
FIG. 14 is a diagram showing a node configuration on the heat pump side according to the second embodiment.

Based on this situation, FIG. 13 shows a structural representation of a distillation column system modified for the connection of the heat pump HP, and FIG. 14 shows a structural representation of the heat pump HP. In these drawings, like reference numerals used to denote the components of the distillation column system according to the first embodiment refer to like or corresponding components.

Preparation of Sequence Graph

Representation of Fluid Connections and Conditions for Flow Control in Distillation Column Table 5 shows fluid connections and conditions for and flow control during the start-up operation on the distillation column side, similar to the ones shown in Table 1, arranged by the same method as the one described in connection with the first embodiment.

TABLE 5

| Stream No. | Node → Node | Phase | Energy | Pump | Valve |
|---|---|---|---|---|---|
| S0 | 0-H → 1-H | L | | P0 | V0 |
| S1 | 1-H → 3 | L | | P1 | V1 |
| S2 | 2 → 3 | L | | | |
| S3 | 3 → 30 | L | | | |
| S3' | 32 → 4 | L | | | |
| S4 | 4 → 5-H | L | | | |
| S5 | 5-H → 6 | L | | | |
| S6 | 6 → 4 | L&V | | | |
| S7' | 4 → 32 | V | | | |
| S7'' | 32 → 31 | V | | | |
| S7''' | 31 → 30 | V | | | |
| S7 | 30 → 3 | V | | | |
| S8 | 3 → 2 | V | | | |
| S9 | 2 → 33-H | V | | | |
| S9' | 33-H → 7 | V | | | |
| S10 | 7 → 8-H | L | | | |
| S11 | 8-H → 2 | L | | P2 | V2 |
| S12 | 8-H → 18 | L | | P3 | V4 |
| S13 | 18 → 9-H | L | | | SV1(2) |
| S14 | 5-H → 17 | L | | P4 | V6 |
| S15 | 17 → 10-H | L | | | SV2(2) |
| S16 | 11 → 12 | L | | | V3 |
| S17 | 12 → 13 | L | +E1 | | |
| S18 | 14 → 15 | V | | | V5 |
| S19 | 15 → 16 | L | −E2 | | |
| S20 | 18 → 1-H | L | | P4 | SV1(1) |
| S21 | 17 → 1-H | L | | | SV2(1) |

Table 5 differs from Table 1 only in that fluids S7', S7'', S7''', S3', S9, and S9' are added or modified.

Transition to Steady-State Operation

Switching from the start-up operation to the steady-state operation on the distillation column side is achieved in the following manner.

When all the hold-ups fulfill their set values during the start-up operation, the valve V1 is closed to stop the material supply, and at the same time, the valves V4 and V6 are closed so that the transition-to-steady-state conditions #1 and #2 are fulfilled in accordance with the full reflux system. When the conditions #1 and #2 are fulfilled, the operation shown in Table 6 is executed.

TABLE 6

| Stream No. | Node → Node | Phase | State of Switching Valve |
|---|---|---|---|
| S13 | (18 → 9-H | L | SV1(2) |
| S15 | (17 → 10-H | L | SV2(2) |

More specifically, the lines S13 and S15 are opened, while the lines S20 and S21 are closed. The transition-to-steady-state conditions #1 and #2 may alternatively be set so that excesses of the column bottom and top temperatures over their respective set values ($T17 > T17^s$, $T18 > T18^s$) can be discriminated thereby.

Representation of Fluid Connections and Conditions for Flow Control in Heat Pump The following is a description of preliminary operations for the operation of the heat pump HP.

Preliminary Operation 1 (injection of working fluid):

In this operation, a valve V50 of a line S51 is opened, and the working fluid is injected into a hold-up H55. When the working fluid is collected to a required amount, the valve V50 is closed (see FIG. 16A).

Preliminary Operation 2 (heat exchanger circulation):

In this operation, the pump P50 is actuated, and the valve V52 is opened to allow the working fluid in the hold-up H55 of the side cooler SC to circulate. Also, the pump P41 is actuated, and the valve V41 is opened to allow the working fluid in the hold-up H54 of the side heater SH to circulate. As the working fluid circulates in this manner, its wettability on the heat transfer surfaces increases, so that the heat transfer efficiency of the system is improved (see FIG. 16B).

Preliminary Operation 3 (construction of compressor circulation line):

This operation should be performed before the activation of the compressors. The valve V54 is opened, the discharge side of the compressor C2 is communicated to the intake-side of the compressor C1, and the load for starting the compressors is reduced (see FIG. 16C).

Preliminary Operation 4 (construction of drain line):

This operation should be also performed before the activation of the compressors. A valve V56 on the discharge side of the first compressor C1 and a valve V55 on the discharge side of the second compressor C2 are opened to discharge the working fluid (water) from the compressors into the hold-up H55 (see FIG. 6D)

Preliminary Operation 5 (ventilation):

This operation should be also performed before the activation of the compressors. Valves V57 and V58 are opened, and air in the heat pump HP is discharged by means of an ejector EJ (see FIG. 16E).

Preliminary Operation 6 (construction of superheating protection line):

This operation is executed when the outlet temperature of the compressor C2 exceeds a specified temperature. A valve V53 is opened, and the working fluid (L) in the hold-up H55 is sprayed into the line between compressors C1 and C2 through the aforesaid circulation line of the side cooler SC. Thus, the working fluid is prevented from being superheated (see FIG. 16F).

Figure 16:
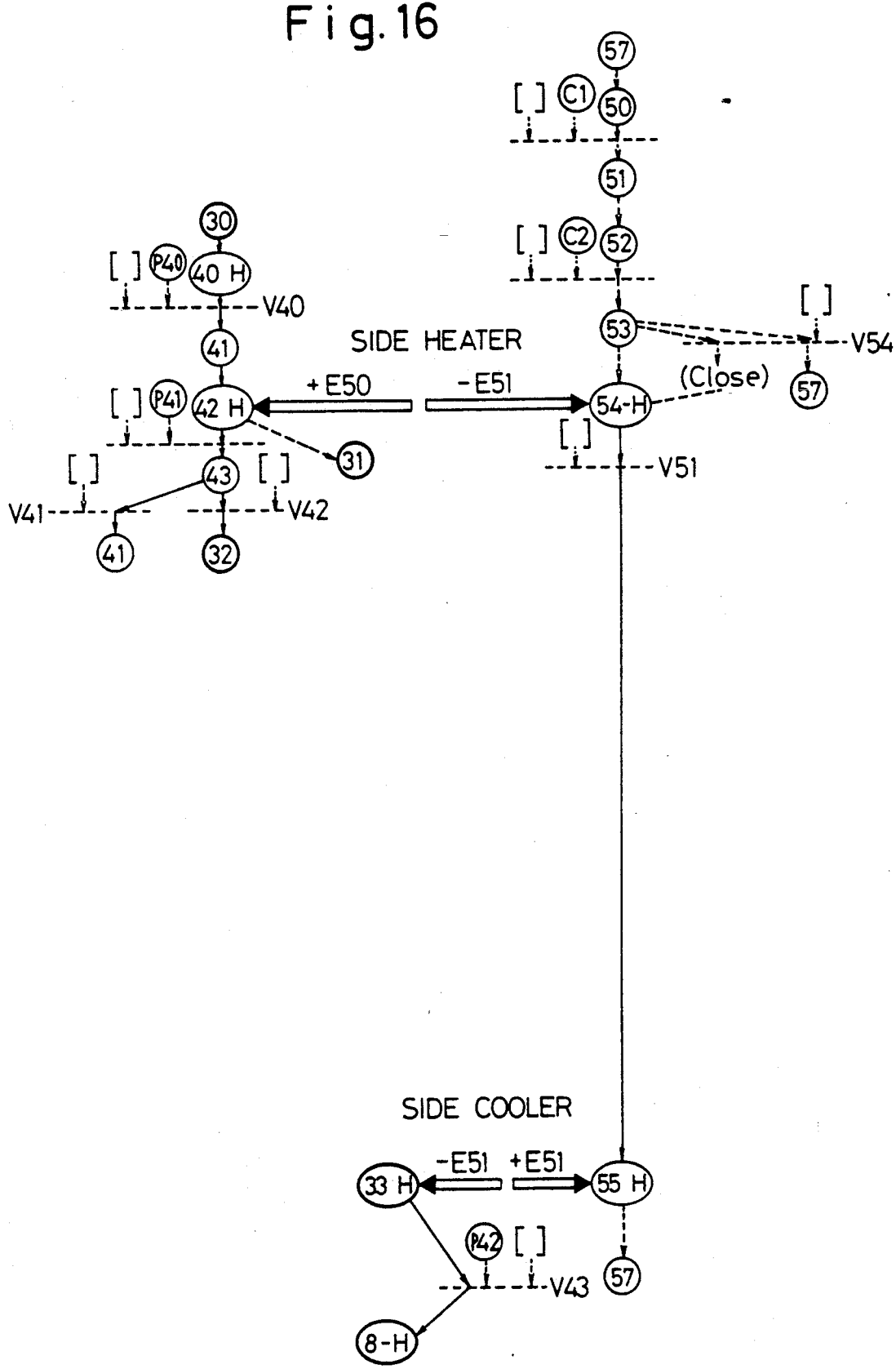
FIG. 16 is a sequence graph illustrating a case in which only the heat pump side of the second embodiment is activated.
Figures 16A, 16D:
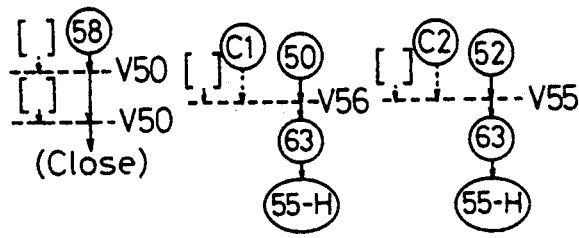
FIG. 16A is a sequence graph illustrating a preliminary operation for the injection of a working fluid in the heat pump.
FIG. 16D is a sequence graph illustrating a preliminary operation for a drain line of the heat pump.
Figures 16C, 16E:
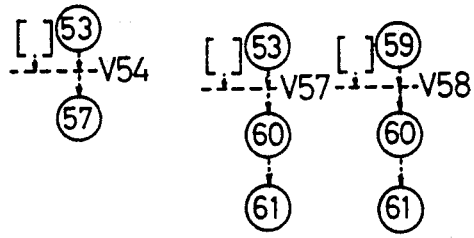
FIG. 16C is a sequence graph illustrating a preliminary operation for a circulation line of a compressor of the heat pump.
FIG. 16E is a sequence graph illustrating a preliminary operation for the ventilation of the heat pump.
Figure 16B:
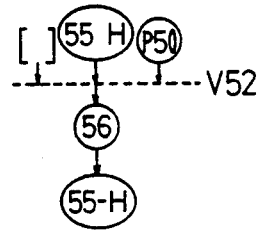
FIG. 16B is a sequence graph illustrating a preliminary operation for the circulation of a heat exchanger working fluid in the heat pump.
Figure 16F:
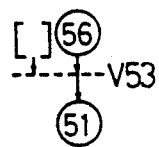
FIG. 16F is a sequence graph illustrating a preliminary operation for a superheating protection line of the compressor of the heat pump.

These preliminary operation sequence graphs, as well as the one shown in FIG. 16 (mentioned later), can be displayed on the screen of the display device 44, and if necessary, these preliminary operations can be introduced as decision conditions for the activation into the sequence graphs. Generally, it is advisable to complete many of these preliminary operations before the first activation associated with the heat pump HP appears, as shown in the sequence graph of FIG. 16.

Tables 7A and 7B show fluid connections and conditions for flow control during the start-up operation in the heat pump and auxiliary lines, arranged in the same manner as in Table 1.

TABLE 7A

| | (Process fluid in heat pump HP and flow conditions in auxiliary lines) | | | |
|---|---|---|---|---|
| Stream No. | Node → Node | Phase | Pump | Valve |
| S40 | 30 → 40-H | L | | |
| S41 | 40-H → 41 | L | P40 | V40 |
| S42 | 41 → 42-H | L | | |
| S43 | 42-H → 43 | L | P41 | |
| S44 | 43 → 41 | L | | V41 |
| S45 | 43 → 32 | V | | V42 |
| S46 | 42-H → 43 | L | +E50 | |

TABLE 7B

| | (Working fluid in heat pump HP and flow conditions in auxiliary lines | | | | |
|---|---|---|---|---|---|
| Stream No. | Node → Node | Phase | Energy | Pump | Valve |
| S50 | 54-H → 55-H | L | −E50 | | V51 |
| S51 | 58 → 55-H | L | | | V50 |
| S52 | 55-H → 56 | L | | P50 | V52 |
| S53 | 56 → 55-H | L | | | |
| S54 | 55-H → 57 | V | +E51 | | |
| S55 | 57 → 50 | V | | | |
| S56 | 50 → 51 | V | | C1 | |
| S57 | 51 → 52 | V | | | |
| S58 | 52 → 53 | V | | C2 | |
| S59 | 53 → 54-H | V | | | |
| S60 | 53 → 57 | V | | | V54 |
| S61 | 53 → 60 | V | | | V57 |
| S62 | 59 → 60 | V | | | V58 |
| S63 | 60 → 61 | V | | | |
| S65 | 50 → 63 | L | | | V56 |
| S66 | 52 → 63 | L | | | V55 |
| S67 | 63 → 55-H | L | | | |

Conditions for Transition to Steady-State Operation of Heat Pump

The operation mode of the heat pump HP is switched from the start-up operation to the steady-state operation as the valve V54 of the circulation line S60 is gradually closed when the working fluid temperatures in the hold-ups H54 and H55 exceed set values T54$^s$ and T55$^s$, respectively (T54>T54$^s$, T55>T55$^s$).

Figure 15:
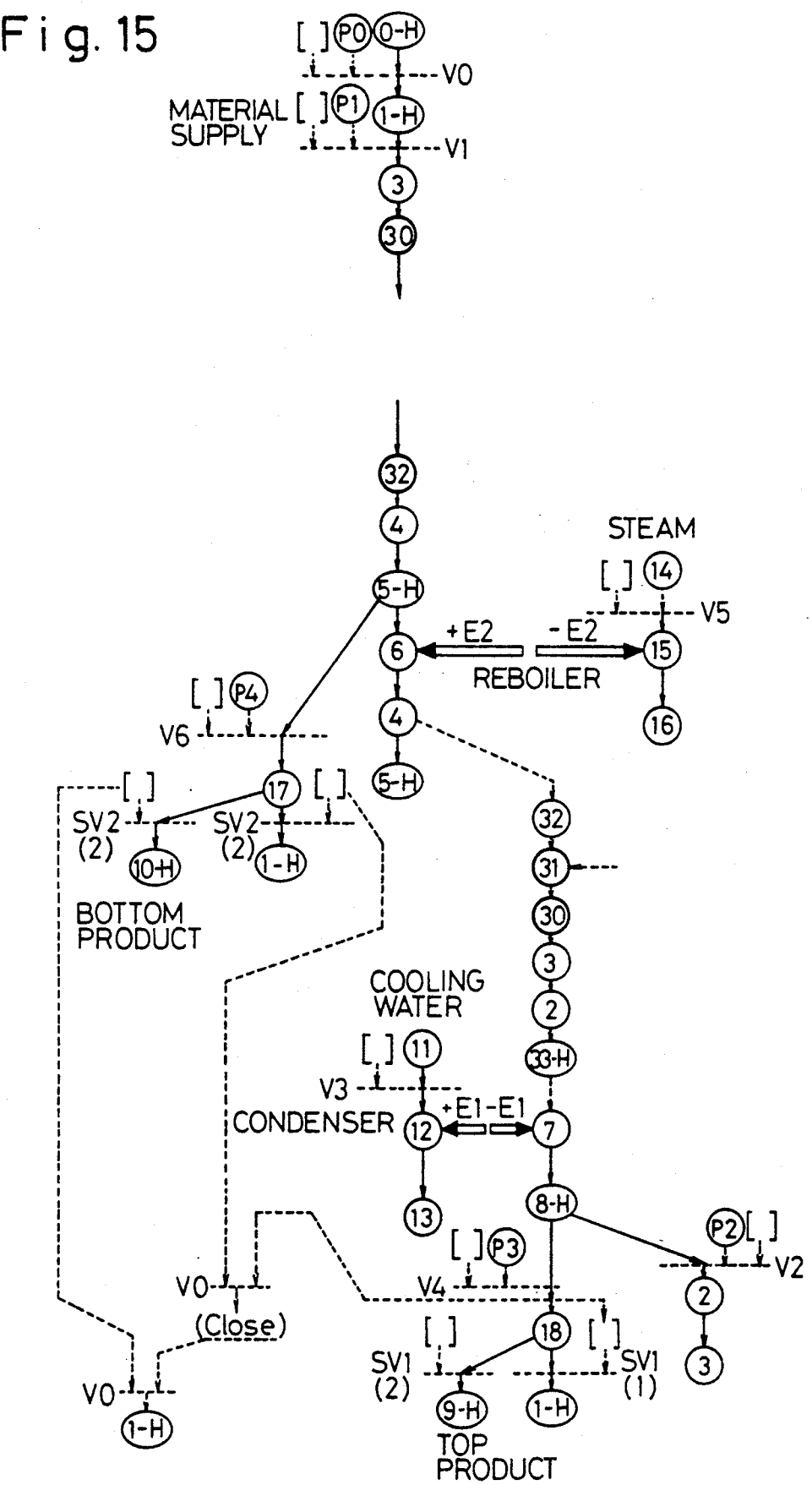
FIG. 15 is a sequence graph illustrating a case in which only the distillation column side of the second embodiment is activated.

When supplied with the fluid connections and conditions for flow control shown in Tables 4 to 7, the electronic control unit 40 creates sequence graphs for the distillation column and the heat pump in the same manner as aforesaid. FIGS. 15 and 16 show the sequence graphs for the distillation column D and the heat pump HP, respectively.

basic concepts, plus "operation mode modification conditions" and "transition-to-steady-state conditions" as required. In many cases, it is preferable that the execution timing is adjusted by using variables, such as the temperature, pressure, and composition of the process fluid in a suitable position, instead of depending solely on the hold-up state. Further, an operating condition for avoiding risky operating conditions may be additionally used. In any case, the plant operation can be made flexible by adding these conditions to the decision conditions for the activation.

According to the second embodiment, it was verified that the use of the pilot plant enables a securer plant operation. Since the completion of the start-up operation took 376 minutes, however, there is yet room for improvement in this arrangement. Thereupon, the operation procedure was improved. Table 10 shows time elapsed for accumulating desired hold-up quantities after the valve operation times shown in FIG. 19.

TABLE 10

| H1 | Material supply tank | 5 min. |
| H5 | Bottom tank | 20 min. |
| H8 | Reflux tank | 70 min. |
| H55 | Side cooler hold-up | 2 min. |
| H54 | Side heater hold-up | 15 min. |
| Heat pump preheating time | | 80 min. |
| Stand-by time for transition to steady-state operation: | | 130 min. |

The time elapsed for fluid supply to the bottom tank H5 at the column bottom can be shortened by preliminarily supplying the tank H5 with the bottom product before the start of the start-up operation. In this case, it is necessary to additionally use a line for supplying the bottom tank H5 with the bottom product.

The time elapsed for preheating the heat pump HP can be shortened if the pump HP is preheated while the working fluid is being introduced into the side cooler SC as a preliminary operation for the pump. In this case, the side cooler SC should be additionally provided with a steam supply line.

The time elasped for fluid supply to the reflux tank H8 at the column top can be shortened by preliminarily supplying the tank H8 with the top product before the start of the start-up operation. Also in this case, it is necessary to additionally use a line for supplying the reflux tank H8 with the top product.

When the aforementioned positive pilot plant was started up after these improvements in line configuration and operation procedure, the start-up operation time required before the start of the steady-state operation was able to be reduced to 168 minutes.

Figure 20:
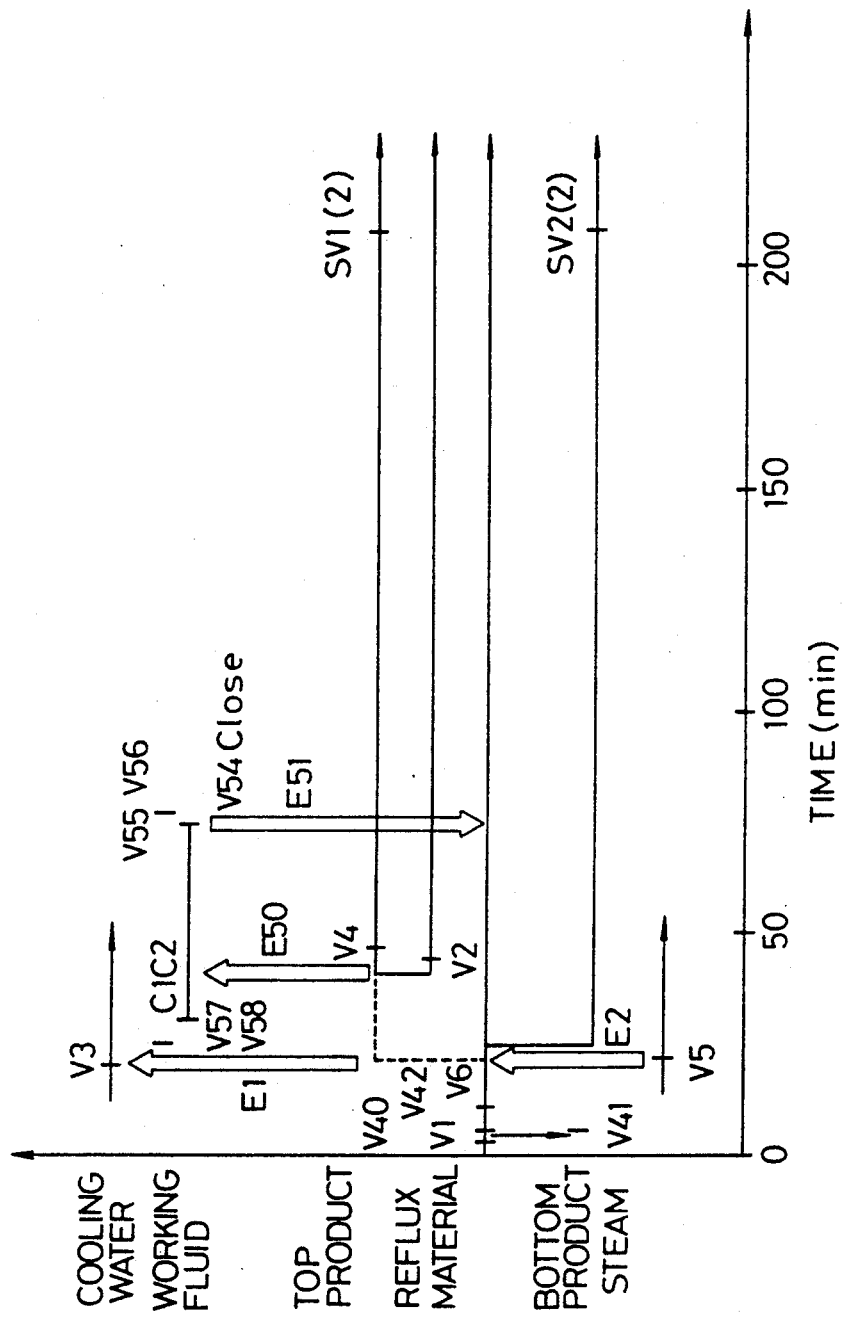
FIG. 20 is a timing chart illustrating operation times for the valves and the like used when the startup time is shortened.

FIG. 20 clearly shows the operation timing for each valve. If the valves are operated not by remote control but by operators at the job site, the stationing of the operators, valve arrangement, etc. can be easily achieved in consideration of the efficiency of the valve operations at the site. More specifically, the timing chart of FIG. 20 and the line configuration are collated with each other for the allotment of the individual valve operations to the operators, or for optimum location of the valves in the case of a one-man operation. These operations can be performed with ease because the plant design definitely corresponds to the plant operation and the timing therefor, based on the sequence graphs of the plant activation display apparatus of the present invention. (Sequence Graph for Shutdown Operation)

Figure 18:
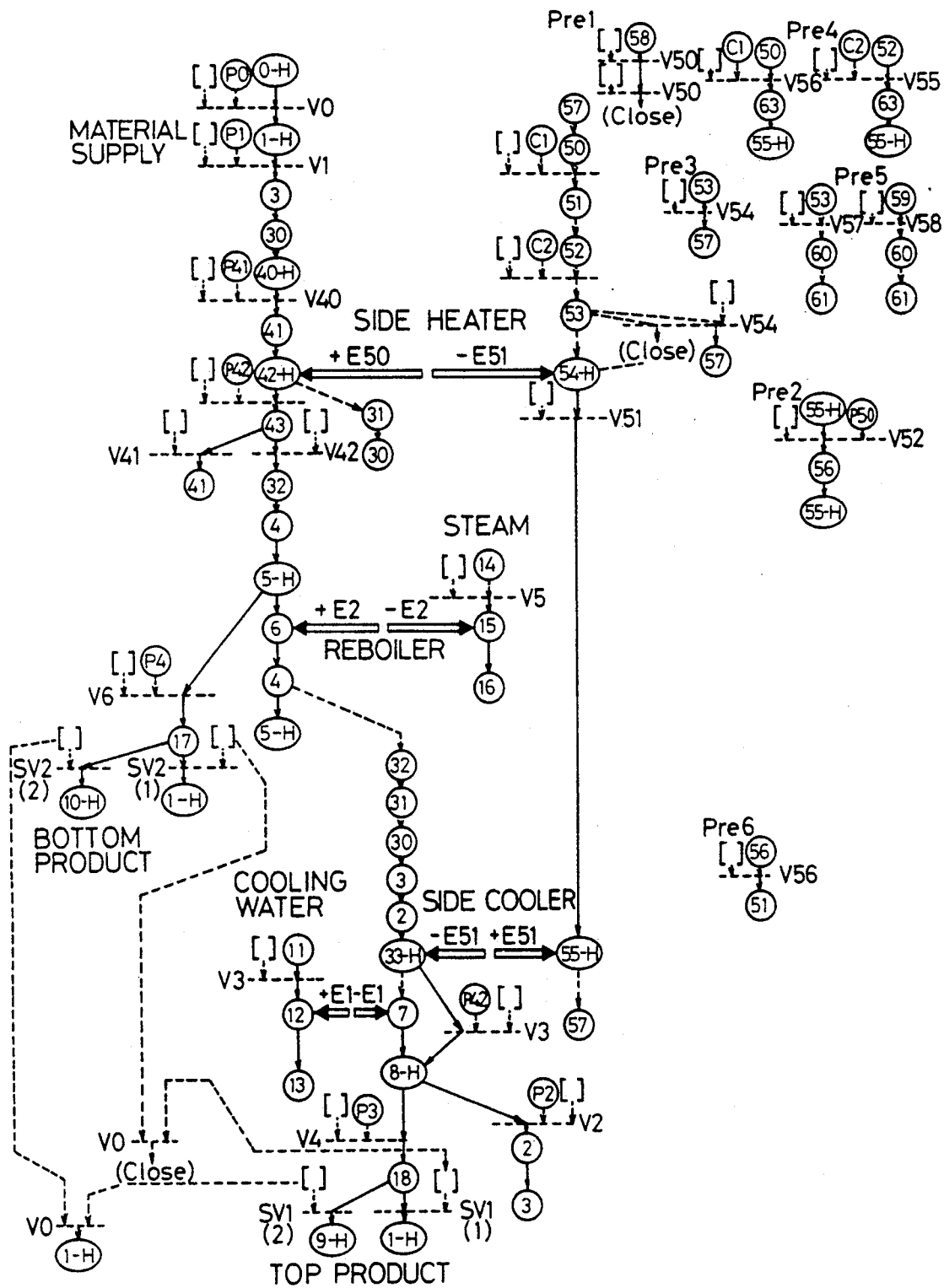
FIG. 18 is a sequence graph illustrating the distillation column system according to the second embodiment.

The shutdown operation procedure for the distillation column system with the heat pump HP can be also decided on the basis of the sequence graph of FIG. 18.

In performing the shutdown operation, the material supply and the supply of steam to the reboiler RB are first stopped. As the steam supply is stopped in this manner, vapor ceases to be generated from the reboiler RB. If the heat pump HP is operating, however, the process fluid can also circulate, so that the pump HP is finally stopped.

The shutdown operation procedure and timing (operation sequence) can be set in the same manner as in the case of the first embodiment. Alternatively, however, these factors may be represented by gradually lowering the brightness of the activation displayed on the screen of the display device 44, using the sequence graph for the start-up operation.

Sequence Graph for Emergency Shutdown Operation

Also in the second embodiment, equipment designed for emergency shutdown, such as a seal gas supply system, emergency removal line for the process fluid, etc., may be added as required to the plant for safety's sake, in the manner described in connection with the first embodiment. It is necessary only that an operation sequence be set in consideration of the added equipment, as in the first embodiment. Also in this case, the activation can be displayed on the screen of the display device 44 in the same manner as in the shutdown operation. If the emergency shutdown equipment is added, its operation only requires emergency shutdown conditions and its operation sequence to the activation decision conditions. Otherwise, the operation is performed in the same manner as the shutdown operation.

It is to be understood that the plant activation display apparatus according to the present invention is not limited to the distillation column systems of the first and second embodiments described herein, and that the invention may be also applied to various other chemical plants. There are several methods for representing sequence graphs for other plant components as follows.

Figure 21:
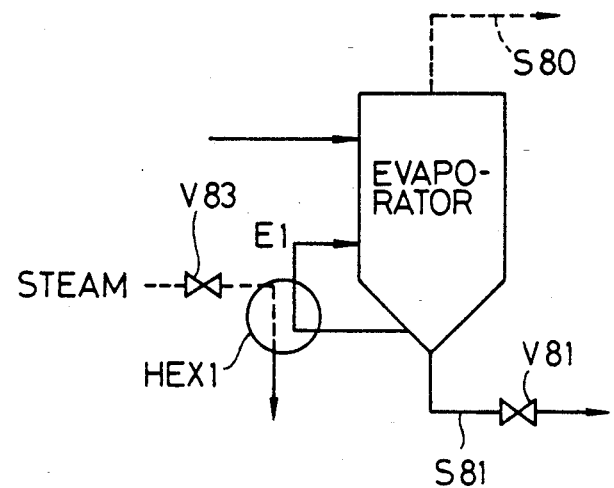
FIG. 21 is a diagram showing a configuration of an evaporator.
Figure 22:
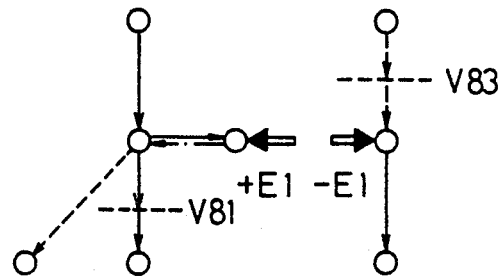
FIG. 22 is a diagram illustrating the way of representing a sequence graph for the evaporator.

FIG. 21 shows an evaporator, in which a process fluid is heated to be evaporated by means of a heat exchanger HEX1 which uses steam as a utility. The evaporated process fluid flows from the evaporator to a line S80, while a liquid collected in the evaporator flows out into a line S81. FIG. 22 shows its sequence graph for the evaporator.

Figure 23:
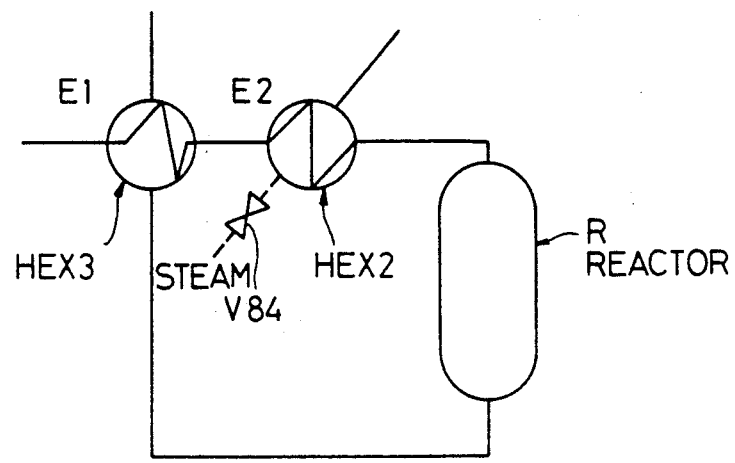
FIG. 23 is a diagram showing a configuration of a self-heat exchanging reactor.
Figure 24:
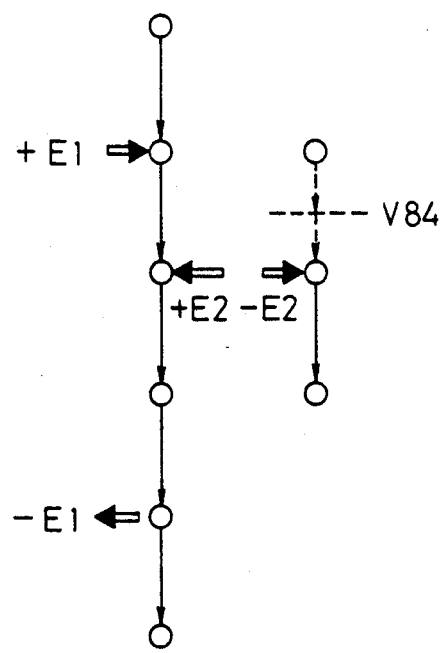
FIG. 24 is a diagram illustrating the way of representing a sequence graph for the reactor of FIG. 23.

FIG. 23 shows a configuration of a self-heat exchanging reactor, in which a reactive mixed process fluid reacts and generates reaction heat. The reactor R comprises two heat exchangers HEX2 and HEX3. The heat exchanger HEX2 uses steam as a heat transfer medium to preheat the process fluid which reacts in the reactor R. In the heat exchanger HEX3, the process fluid heated to high temperature by the reaction heat generated in the reactor R heats the process fluid itself flowing into the reactor R. FIG. 24 shows a sequence graph for the self-heat exchanging reactor.

The following is an illustration of the way of representing fluid connections and conditions for flow control obtained when phase changes are caused at nodes by crystallization, flash, liquefaction under pressure, or sedimentation separation.

Figure 17:
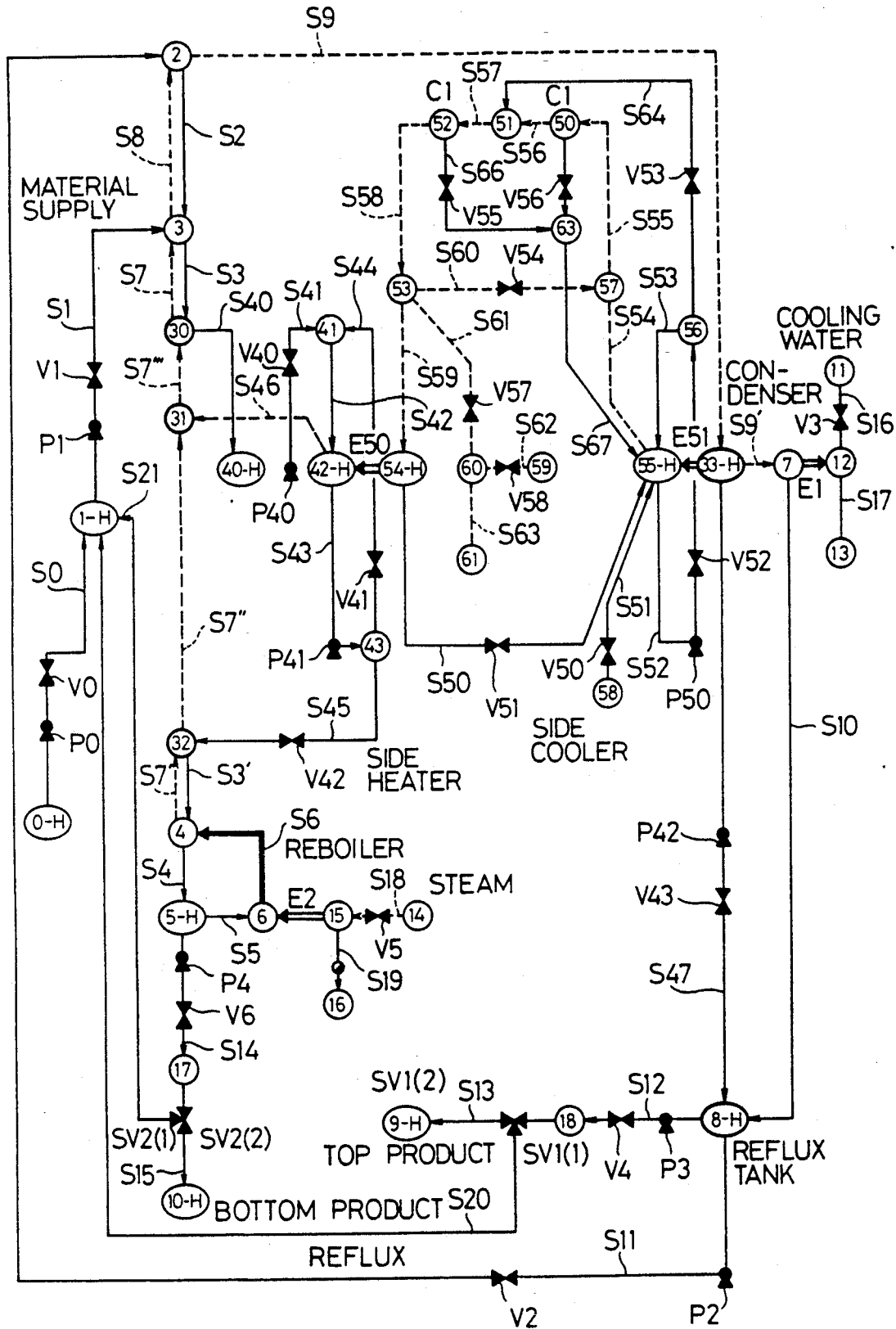
FIG. 17 is a diagram showing a node configuration for connecting the distillation column and the heat pump.

FIG. 17 shows a line configuration of the combined system obtained by superposing two junctions of the heat exchangers shown in FIGS. 13 and 14. FIG. 18 is a sequence graph for this combined system, which can be represented by superposing the junctions, as in the case of the superposition of the line configurations. This sequence graph, which incorporates the sequence graphs of FIGS. 16A to 16F for the preliminary operation of the heat pump HP, represents the procedure and execution timing for the start-up operation of the whole system.

Thus, the sequence graphs of the plant activation display apparatus according to the present invention correspond to the line configurations in the operation procedure and execution timing. Accordingly, modifying the line configurations and combining the units can be effected very easily.

In the start-up operation of the combined system, as described before with reference to FIG. 11, it is necessary only that activations be successively executed from the inlet node side, in the same manner of the first embodiment. The start-up operation of the heat pump HP is finished by closing the circulation line S60. In this case, heat exchange between the working fluid and the process fluid starts before the line S60 is closed. Thus, the target function or compressing effect of the heat pump unit can be fulfilled by cutting off the circulation line S60 when the working fluid is preheated to a certain temperature. The sequence graph of FIG. 18 represents the steps of operation procedure before the transition to the steady-state operation of the heat pump HP and the timings therefor, as well as the order of the operation timings on the heat pump side and on the distillation column side. In the sequence graphs of FIGS. 15, 16, 16A to 16F, and 18, the display of the specific decision conditions for the execution of activation is omitted. Actually, however, all the necessary decision conditions are to be described in the brackets [ ].

In the sequence graphs of the plant activation apparatus according to the present invention, the flow directions correspond to the time axis. The speed of the process fluid flowing between the nodes and the time elapsed before the hold-up quantities attain the set values can be estimated from simple operational expressions or empirical values. Shortening time elapsed for the start-up operation can be facilitated by arranging the steps of procedure and execution timing for the start-up operation in a time series based on the sequence graphs. If the operation times for the valves and the pumps in the sequence graphs are fetched and rearranged on the time series basis, for example, time elapsed for individual steps of the start-up operation can be more clearly indicated.

Figure 19:
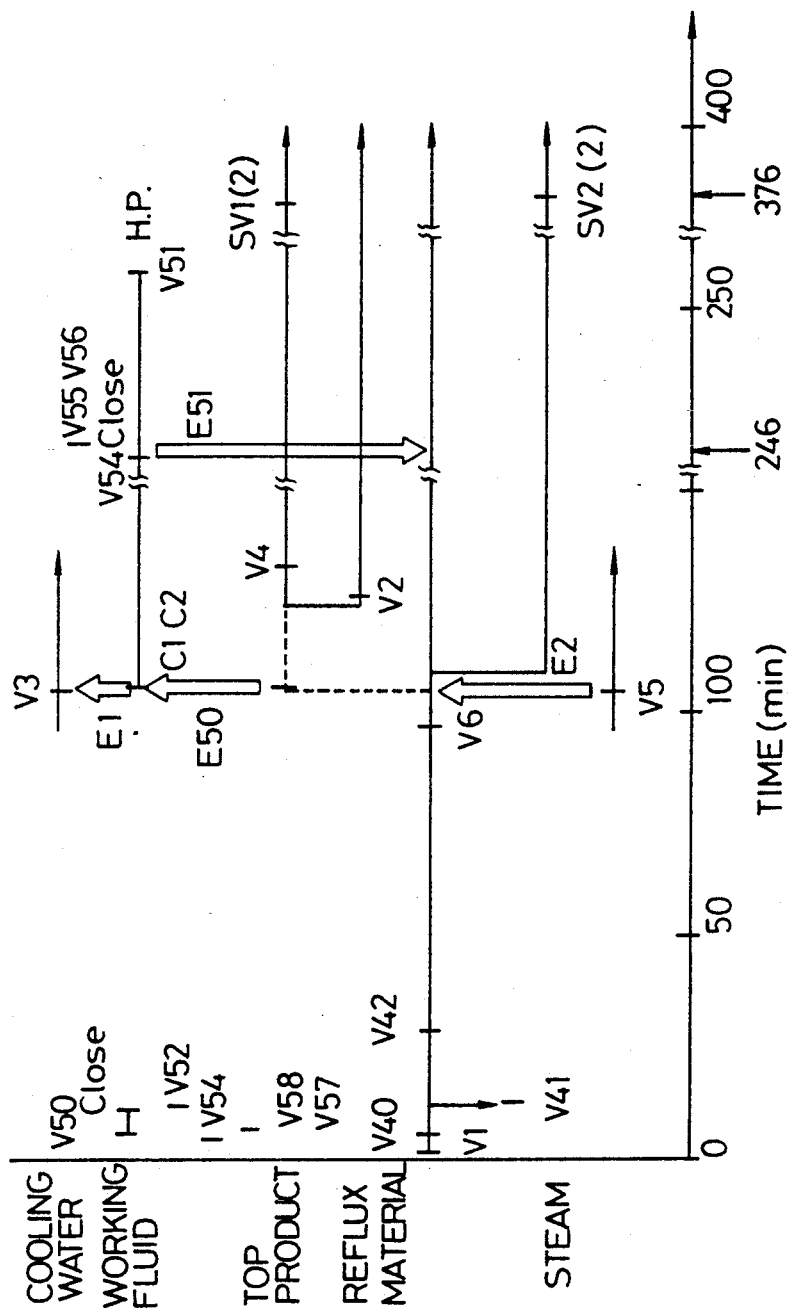
FIG. 19 is a timing chart illustrating operation times for the valves and the like used when the distillation column system is started up in accordance with the sequence graph of FIG. 18.

FIG. 19 shows the operation times of the valves after the starting time for the start-up operation of a positive pilot plant based on the sequence graph of FIG. 18, that is, the times for the start of individual activations and transitions to the steady-state operation, arranged on the time series basis.

The configuration and operating conditions of this positive pilot plant are as follows, The distillation column D is a packed column (column section) with a diameter of 200 mm and height of 5,000 mm, and a 1-inch mini-cascade ring is used as a packing, whose packing height is 4,000 mm. The process fluid to be separated in the column is a mixture of ethanol and water. As a result of an experiment, it is ascertained that the theoretical number of stages corresponding to a plate-column of the target packed column, including the reboiler RB, is 11.

The material is supplied to a seventh stage counted from the column top as a first stage. A side-cut plate for feeding the process fluid to the side heater SH of the heat pump HP corresponds to the eighth plate of the distillation column D. The reboiler RB of the column D has a heat transfer area of 2.0 $m^2$, and steam of 2.0 $kgfG/cm^2$ is used as a heating utility. In the reboiler RB, heat exchanges of about 40 kW and 16 kW are made during the start-up operation and steady-state operation, respectively.

The condenser CD of the distillation column D, whose heat transfer area is 4 $m^2$, uses water as a cooling utility. Table 8 shows the principal specifications of the distillation column of the pilot plant.

TABLE 8

| Type | Packed column |
| --- | --- |
| Diameter | 200 mm |
| Height of packed zone | 4,000 mm |
| Theoretical number of plates | 11 |
| Reboiler hold-up | 70 liter |
| Reflux tank hold-up | 40 liter |

The heat pump HP, which is of an indirect compression type, uses water as a working fluid. The compressors C1 and C2 are rotary compressors, which are used in series with each other, enjoying a great difference in compression temperature. Further, each compressor is provided with an inverter for load adjustment.

The two heat exchangers, that is, the side heater SH and the side cooler SC, which constitute a section through which heat is delivered to or from the distillation column D, are of a falling-film type. Thus, these heat exchangers can satisfactorily exchange heat energy despite a relatively small temperature difference from the process fluid. Table 9 shows the principal specifications of the heat pump of the pilot plant.

TABLE 9

| Type | Indirect compression type |
| --- | --- |
| Working fluid | Water |
| Compressor type | 2-stage rotary type compressors |
| Heat exchanger type | falling film type |
| Heat transfer area of SH | 3.43 $m^2$ |
| Heat transfer area of SC | 5.14 $m^2$ |
| SH | |
| Processing fluid hold-up | 20 liter |
| Working fluid | 7 liter |
| SC | |
| Processing fluid hold-up | 7 liter |
| Working fluid | 20 liter |

This pilot plant was brought to a stand-by state for the transition to the steady-state operation of the distillation column when the heat pump HP was switched to the steady-state operation, that is, in 246 minutes after the start of the start-up operation. The whole system entered the steady-state operation in 376 minutes after the start of the start-up operation.

Thus, by operating the plant in accordance with the sequence graphs displayed by means of the plant activation display apparatus according to the present invention, the plant was able to be activated stably and securely to a target state.

In the first and second embodiment described above, the start-up operation procedure is composed of the ideas of "flow control" and "hold-up control," as the

Crystallization

TABLE 11

| Stream No. | Node → Node | Phase | Energy |
|---|---|---|---|
| S90 | (N1 → N2 | L | |
| S91 | (N2 → N3 | L+S | −E |

Table 11 indicates that a process fluid S90 in the liquid phase L is cooled to be partially crystallized at a node N2, thus forming a process fluid S91 containing portions in the solid phase S and the liquid phase L.

Flash

TABLE 12

| Stream No. | Node → Node | Phase | Energy |
|---|---|---|---|
| S92 | (N5 → N6 | L | |
| S93 | (N6 → N7 | L | −P |
| S94 | (N6 → N8 | V | −P |

Table 12 indicates that a process fluid S92 in the liquid phase L is decompressed to be partially vaporized at a node N6, thus forming a process fluid S94 in the gas phase V and a process fluid S93 in the liquid phase L.

Liquefaction under Pressure

TABLE 13

| Stream No. | Node → Node | Phase | Energy |
|---|---|---|---|
| S97 | (N11 → N12 | L | +P |

Table 13 indicates that a process fluid S96 in the gas phase V is pressurized to be condensed at a node N11, thus forming a process fluid S97 in the liquid phase L.

Sedimentation Separation

TABLE 14

| Stream No. | Node → Node | Phase |
|---|---|---|
| S88 | (N14 → N15 | L+S |
| S89 | (N15 → N16 | L |
| S90 | (N15 → N17 | L+S |

Table 14 indicates that a fluid S88 enters a node N15 in the form of a slurry, whereupon it is divided into two phases, the liquid phase L and the slurry phase (L+S). These two divisions emerge from the node N15 in the form of a fluid S89 and a fluid S90.

Supply of Process Fluids A & B

Figure 25:
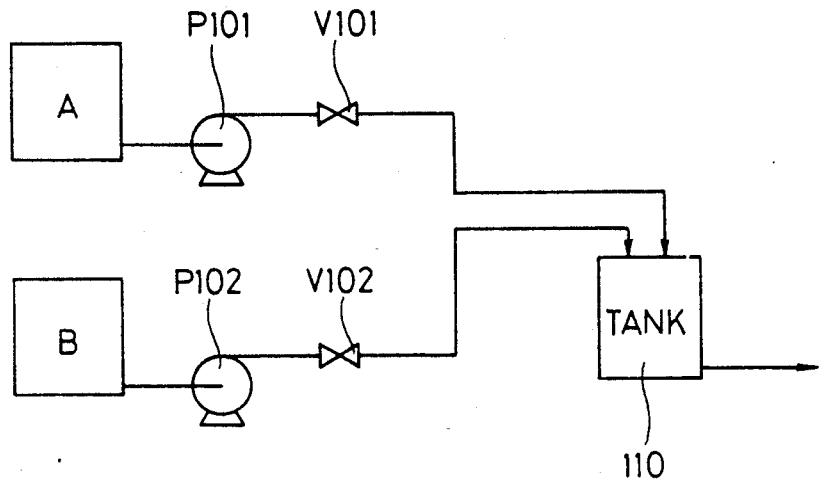
FIG. 25 is a block diagram showing a line configuration for supplying two types of fluids A and B to a tank 110.

A chemical plant may be operated in different ways without changing its configuration. When process fluids A and B are supplied to a tank 110, as shown in FIG. 25, the following different methods may have to be used depending on the processes to be executed.

Figure 26:
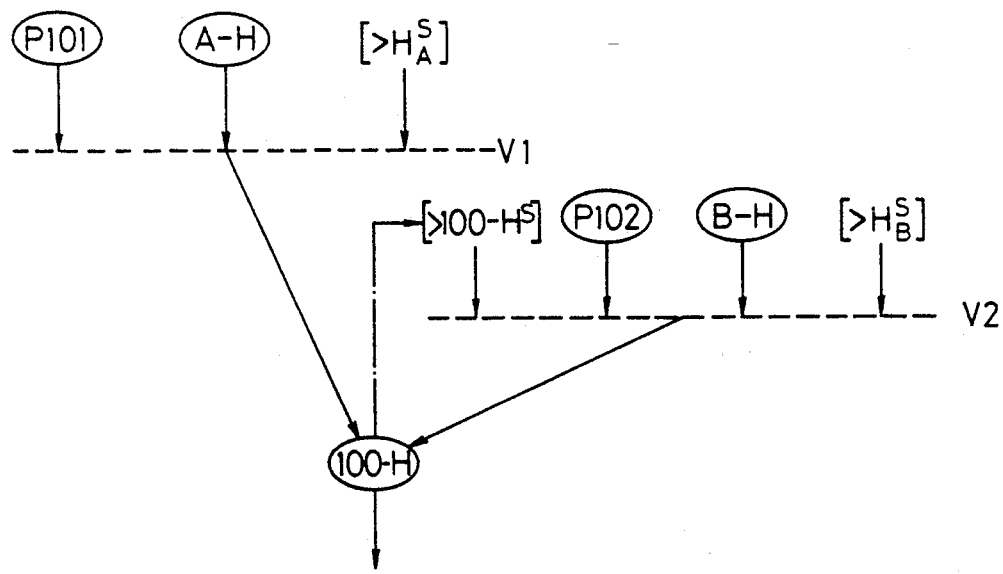
FIG. 26 is a diagram illustrating the way of representing a sequence graph used when the supply of the fluid B is started after a set amount of the fluid A is introduced into the tank.

According to the first supply method, the process fluid A is first supplied to the tank 110. When the resulting hold-up quantity attains a set value [>100−H$^s$], the process fluid B is then supplied to the tank 110. FIG. 26 shows a sequence graph for this case, in which a hold-up quantity condition [>100−H$^s$] is added to an activation condition for a valve V102.

Figure 27:
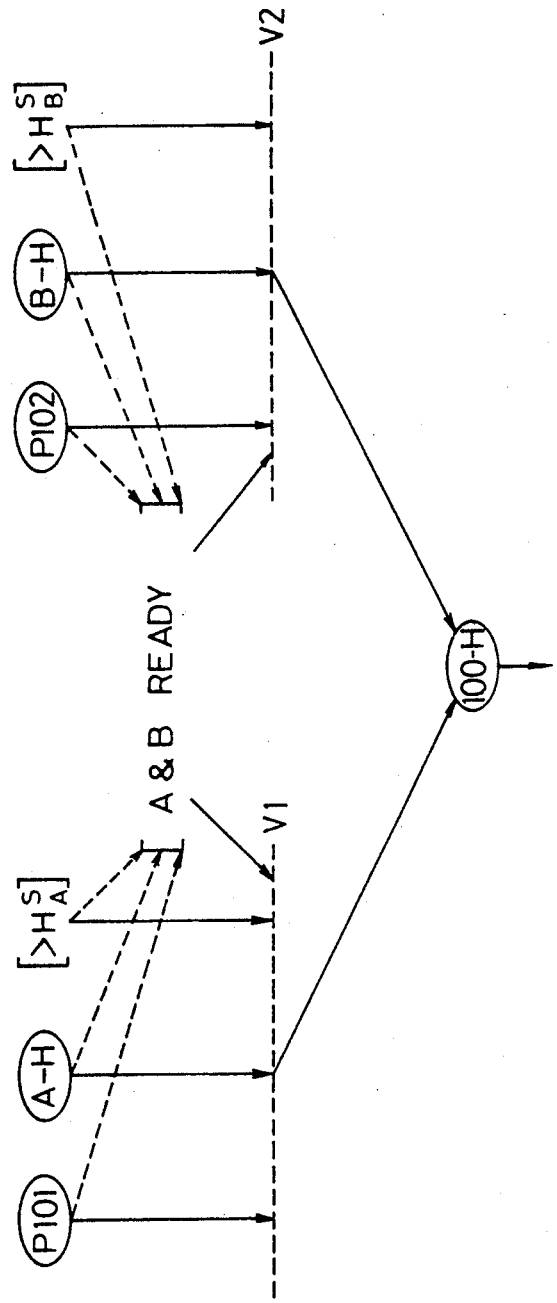
FIG. 27 is a diagram illustrating the way of representing a sequence graph used when the fluids A and B are simultaneously supplied to the tank.
Figure 28:
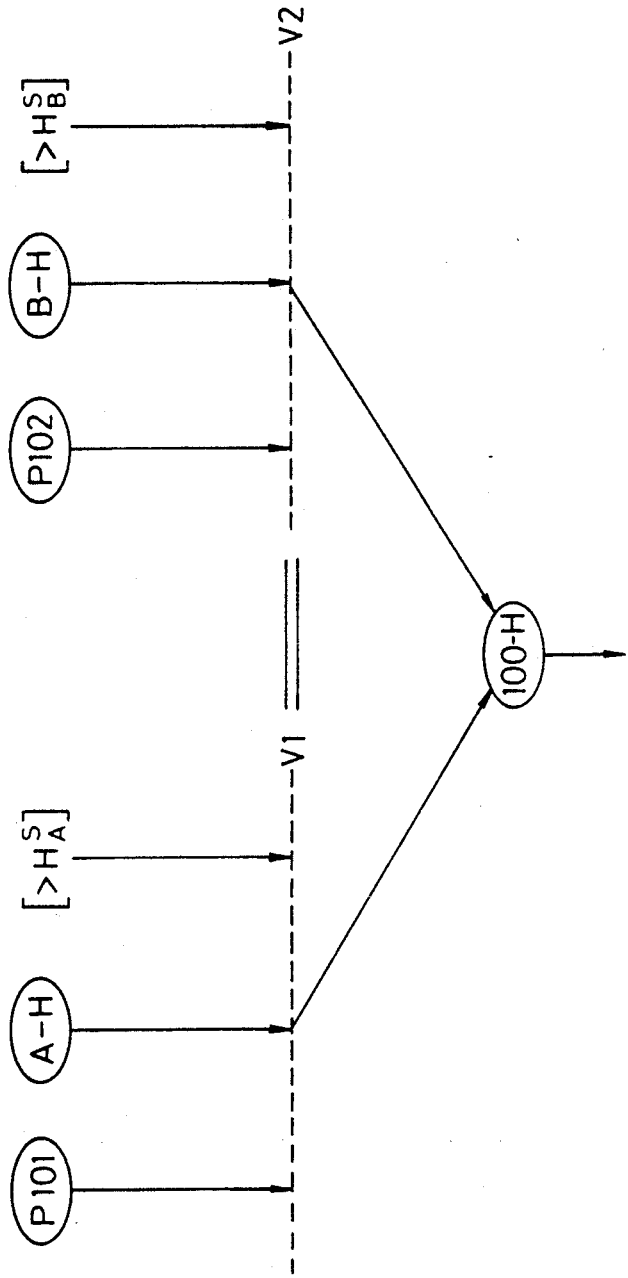
FIG. 28 is a diagram illustrating the way of representing a sequence graph equivalent to the one shown in FIG. 26, used when the fluids A and B are simultaneously supplied to the tank.
Figure 29:
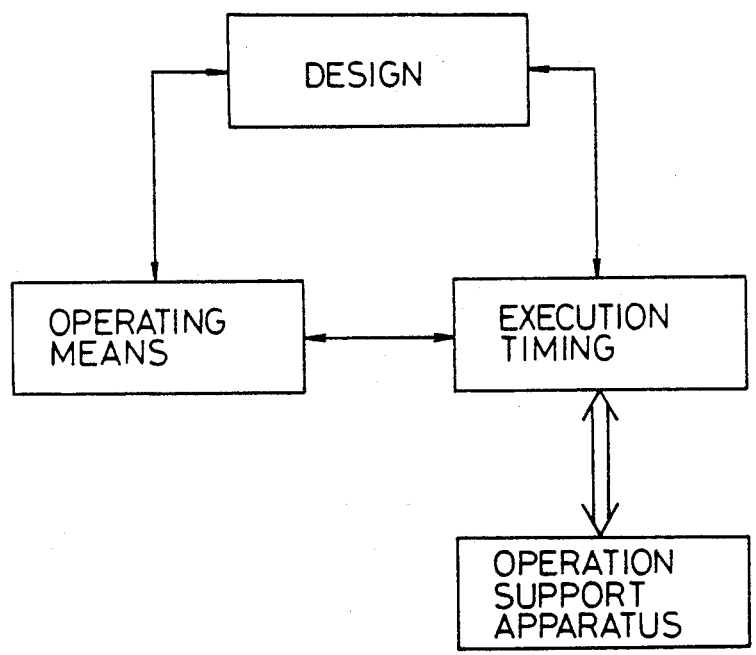
FIG. 29 is a block diagram for illustrating the basic concept of the present invention.

According to a second supply method, the process fluids A and B are simultaneously supplied to the tank 110. FIG. 27 shows a sequence graph for this case, in which the condition that both of preliminary operations for the fluids A and B are finished is added to activation conditions for valves V101 and V102. Thus, the moment the preliminary operations for the process fluids A and B are both finished, the valves 101 and V102 are simultaneously opened. The sequence graph of FIG. 27 can be rewritten into the one shown in FIG. 28 according to a conventional method of sequence graph representation. This sequence graph also indicates that the valves V101 and V102 are opened in synchronism with each other.

Although the sequence graphs are displayed on the screen of the display device 44 in the embodiments described above, they may be printed out by means of the printer 46. Alternatively, as shown in FIG. 2, the activation display apparatus may be distributively connected to a distributed control system (DCS) 49 for each plant so that the aforementioned sequence graphs are delivered as required from the central electronic control unit 40 to the display apparatus in the plant, thus constituting part of the control system.

What is claimed is:

1. A plant activation tracking and display apparatus for use in a plant in which a plurality of points of plant components are represented by a plurality of nodes including at least one system input node through which an input fluid is externally supplied to the plant, and at least one system output node through which an output fluid flows out from the plant, adjacent nodes of said plurality of nodes being connected by means of fluid passages, at least some of said fluid passages having at least one transportation means and/or valve means for creating a fluid flow in a specified direction, the apparatus further comprising:

an output device including:
  means for categorizing all fluids flowing through said fluid passages, when the plant is in operation at a steady-state condition, in accordance with a type and a phase of said fluids,
  means for successively tracking categorized fluids with a specified phase over said plurality of nodes from said system input node to said system output node, and
  display means for sequentially displaying arrays of tracked nodes of said plurality of nodes in one direction;
memory means for previously storing data which correspond to operating conditions for each said transportation means and/or valve means;
sensor means for sensing the operating conditions for each said transportation means and/or valve means to determine whether the operating conditions for each said transportation means and/or valve means are fulfilled; and
output device control means for successively determining whether said operating conditions for each said transportation means and/or valve means are fulfilled, starting from the system input node side, and for causing the output device to make an emphatic indication that each said transportation means and/or valve means be operated when said operating conditions thereof are fulfilled, and to make a further emphatic indication of only fluid passages between nodes through which fluid is caused to flow by the operation of each said transportation means and/or valve means.

2. The plant activation tracking and display apparatus according to claim 1, wherein said plant components include a heat exchanging component, and at least one of said plurality of nodes is connected to a node of said heat exchanging component through energy transfer, said heat exchanging component being displayed on the output device adjacent to a display of energy transferring nodes in parallel relation therewith.

3. The plant activation tracking and display apparatus according to claim 2, wherein the fluids flowing through the fluid passages connected to a node which exchanges energy with the node of said heat exchanging component are identically categorized fluids if said fluids change in phase around the node which exchanges energy with the node of said heat exchanging component.

4. The plant activation tracking and display apparatus according to claim 1, wherein said plant components include a hold-up device to be displayed as one node.

5. The plant activation tracking and display apparatus according to claim 1, wherein said output device comprises an image display device.

6. The plant activation tracking and display apparatus according to claim 1, wherein said output device comprises a printer.

7. The plant activation tracking and display apparatus according to claim 1, wherein said plant comprise a plurality of plant units.

8. An automatic plant operation apparatus comprising the plant activation tracking and display apparatus according to claim 1, and drive means for driving said transportation means and/or valve means when the operating conditions thereof are fulfilled.

9. The plant activation tracking and display apparatus according to claim 1, wherein at least one of said nodes has a fluid flowing out from said at least one of said nodes, said fluid returning along a flowing direction which is identical in phase through at least one fluid passage to said at least one of said nodes.

10. The plant activation tracking and display apparatus according to claim 1, wherein said transportation means and/or valve means is provided in an intermediate portion of each of said fluid passages.

11. The plant activation tracking and display apparatus according to claim 2, wherein said plant comprises a plurality of plant units.

12. The plant activation tracking and display apparatus according to claim 3, wherein said plant comprises a plurality of plant units.

13. A plant activation tracking and display apparatus for evaluating plant activation through simulated operation of a plant in which a plurality of points of plant components are represented by a plurality of nodes including at least one system input node through which an input fluid is externally supplied to the plant, and at least one system output node through which an output fluid flows out from the plant, adjacent nodes of said plurality of nodes being connected by means of fluid passages, at least some of said fluid passages having at least one transportation means and/or valve means for creating a fluid flow in a specified direction, the apparatus further comprising:

an input device for producing a data signal through external input operation;

an output device including means responsive to the data signal delivered from said input device, for categorizing all fluids flowing through said fluid passages when the plant is in operation at a steady-state condition, in accordance with a type and a phase of said fluids, for successively tracking categorized fluids with a specified phase over said plurality of nodes from said system input node to said system output node, and for sequentially displaying arrays of tracked nodes of said plurality of nodes in one direction;

memory means for previously storing data corresponding to operating conditions for each said transportation means and/or valve means in response to the data signal delivered from said input device;

simulation signal output means for outputting a simulated signal for simulatively making said operating conditions for each said transport means and/or valve means fulfilled to desired operating conditions; and output device control means for successively determining whether said operating conditions for each said transportation means and/or valve means are fulfilled, starting from the system input node side, depending on the presence of the simulated signal output from said simulation signal output means, and for causing the output device to make an emphatic indication that each said transportation means and/or valve means be operated when said operating conditions thereof are fulfilled, and to make a further emphatic indication of only fluid passages between nodes through which fluid is caused to flow by the operation of each said transportation means and/or valve means.

14. The plant activation tracking and display apparatus according to claim 13, wherein said plant components include a heat exchanging component, and one of said plurality of nodes is connected to a node of said heat exchanging component through energy transfer, said heat exchanging component being displayed on the output device, adjacent to a display of energy transferring nodes in parallel relation therewith.

15. The plant activation tracking and display apparatus according to claim 14, wherein the fluids flowing through the fluid passages connected to a node which exchanges energy with the node of said heat exchanging component identically categorized fluids if said fluids change in phase around said node which exchanges energy with the node of said heat exchanging component.

16. The plant activation tracking and display apparatus according to claim 13, further comprising command means for outputting a pseudo command signal for manually controlling a specified transportation means and/or valve means through human-manipulation, said manually controlling including one of activating and stopping, and wherein said output device control means causes the output device to make an emphatic indication of only fluid passages between nodes through which new fluid is caused to flow when said specified transportation means and/or valve means is manually controlled, in response to the pseudo command signal from said command means, and to make a further emphatic indication that each said transportation means and/or valve means be operated when the operating conditions thereof are changed due to new fluid flows.

17. The plant activation tracking and display apparatus according to claim 13, wherein said plant components include a hold-up device to be displayed as one node.

18. The plant activation tracking and display apparatus according to claim 13, wherein said output device comprises an image display device.

19. The plant activation tracking and display apparatus according to claim 13, wherein said output device comprises a printer.

20. The plant activation tracking and display apparatus according to claim 13, wherein said plant comprises a plurality of plant units.

21. The plant activation tracking and display apparatus according to claim 13, wherein said transportation means and/or valve means is provided in an intermediate portion of each of said fluid passages.

22. The plant activation tracking and display apparatus according to claim 14, wherein said plant comprises a plurality of plant units.

23. The plant activation tracking and display apparatus according to claim 15, wherein said plant comprises a plurality of plant units.

* * * * *